US012615412B2

(12) United States Patent
Hoff et al.

(10) Patent No.: US 12,615,412 B2
(45) Date of Patent: Apr. 28, 2026

(54) ADDRESSABLE ADVERTISEMENT AND PROGRAMMATICALLY DELIVERED ADVERTISEMENT INSERTION AND PLAYING

(71) Applicant: DISH Network L.L.C., Englewood, CO (US)

(72) Inventors: Aaron S. Hoff, Littleton, CO (US); Brian J. Smith, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/774,401

(22) Filed: Jul. 16, 2024

(65) Prior Publication Data

US 2025/0097499 A1     Mar. 20, 2025

Related U.S. Application Data

(60) Provisional application No. 63/538,620, filed on Sep. 15, 2023.

(51) Int. Cl.
  *H04N 21/44* (2011.01)
  *H04N 21/2187* (2011.01)
  (Continued)

(52) U.S. Cl.
  CPC ... *H04N 21/44016* (2013.01); *H04N 21/2187* (2013.01); *H04N 21/23424* (2013.01);
  (Continued)

(58) Field of Classification Search
  CPC ......... H04N 21/44016; H04N 21/2187; H04N 21/23424; H04N 21/2668; H04N 21/4131;
  (Continued)

(56) References Cited

U.S. PATENT DOCUMENTS 7,631,331 B2   12/2009 Sie et al.
7,930,716 B2*   4/2011 Liga ..................... H04N 21/812
                                                       725/35
(Continued)

FOREIGN PATENT DOCUMENTS

CN        111970686 A      11/2020
EP          3840439 A2      6/2021
(Continued)

OTHER PUBLICATIONS

Dyoniziak et al., "Detecting Content of Interest in Streaming Media," U.S. Appl. No. 17/827,211, filed May 27, 2022. (36 Pages).
(Continued)

*Primary Examiner* — Fernando Alcon
(74) *Attorney, Agent, or Firm* — Jeremiah J. Baunach; Frontier IP Law PLLC

(57) ABSTRACT

It may occur that various addressable ads are used to help fill an entire addressable break which have little or no monetary value for being played (often referred to as "evergreen or "filler" ads). Such ads and other types of candidate ads for replacement are replaced in real time with programmatically delivered Internet Protocol (IP) based ads (IP ads). Upon encountering an indication of an upcoming ad break including one or more evergreen ads in an addressable ad playlist, an ad request may be automatically transmitted that puts those evergreen ad spots up for bidding by various advertisers, and then such ads may be replaced by IP ads that in total have a duration equaling the duration of the evergreen ads being replaced and that are based on, among other things, a user's or household's receiving device location, a current channel a particular receiving device at that location is tuned to, a particular program that is playing on that channel, a genre of the program, individual user and/or household demographics including, but not limited to: age category, marital status, income range, gender, education
(Continued)

level, occupation, and number of people in the household, etc. The selected IP ad(s) are then, in real time, seamlessly inserted or "stitched", as described herein, into a media content stream comprising or consisting of the television programming (e.g., live linear satellite (SAT) stream) or other media content stream.

17 Claims, 17 Drawing Sheets

(51) Int. Cl.

| | |
|---|---|
| *H04N 21/234* | (2011.01) |
| *H04N 21/2668* | (2011.01) |
| *H04N 21/41* | (2011.01) |
| *H04N 21/442* | (2011.01) |
| *H04N 21/45* | (2011.01) |
| *H04N 21/458* | (2011.01) |
| *H04N 21/472* | (2011.01) |
| *H04N 21/643* | (2011.01) |
| *H04N 21/81* | (2011.01) |
| *H04N 21/8547* | (2011.01) |

(52) U.S. Cl.
CPC ..... *H04N 21/2668* (2013.01); *H04N 21/4131* (2013.01); *H04N 21/442* (2013.01); *H04N 21/44204* (2013.01); *H04N 21/4532* (2013.01); *H04N 21/458* (2013.01); *H04N 21/47217* (2013.01); *H04N 21/64322* (2013.01); *H04N 21/812* (2013.01); *H04N 21/8547* (2013.01)

(58) Field of Classification Search
CPC ........... H04N 21/442; H04N 21/44204; H04N 21/4532; H04N 21/458; H04N 21/47217; H04N 21/64322; H04N 21/812; H04N 21/8547
See application file for complete search history.

(56) References Cited

U.S. PATENT DOCUMENTS

| | | | |
|---|---|---|---|
| 8,352,981 B1 | 1/2013 | Oztaskent | |
| 8,468,056 B1 | 6/2013 | Chalawsky | |
| 8,516,119 B2 | 8/2013 | Banger et al. | |
| 8,799,943 B1 | 8/2014 | Sherwin et al. | |
| 9,066,138 B1 | 6/2015 | Kraiman et al. | |
| 9,510,025 B1 | 11/2016 | Einarsson et al. | |
| 9,521,437 B2* | 12/2016 | Sellers ............. | H04N 21/23424 |
| 9,661,380 B2 | 5/2017 | Major et al. | |
| 9,848,249 B2 | 12/2017 | Freed et al. | |
| 10,904,639 B1* | 1/2021 | Benson ............. | H04N 21/2393 |
| 10,945,048 B2 | 3/2021 | Major et al. | |
| 11,172,269 B2 | 11/2021 | Major | |
| 11,178,469 B2 | 11/2021 | Major | |
| 11,641,579 B1 | 5/2023 | Mukherjee et al. | |
| 11,659,259 B1 | 5/2023 | Pressnell et al. | |
| 11,871,050 B1 | 1/2024 | Koceski et al. | |
| 2004/0128682 A1* | 7/2004 | Liga ..................... | H04N 21/235 |
| | | | 725/35 |
| 2004/0189873 A1 | 9/2004 | Konig et al. | |
| 2005/0204381 A1* | 9/2005 | Ludvig ................ | H04N 21/812 |
| | | | 725/35 |
| 2006/0253864 A1 | 11/2006 | Easty | |
| 2007/0157228 A1* | 7/2007 | Bayer ............. | H04N 21/26208 |
| | | | 348/E7.071 |
| 2007/0219859 A1 | 9/2007 | Huntington | |
| 2008/0132226 A1 | 6/2008 | Carnall | |
| 2009/0025026 A1* | 1/2009 | Mick, Jr. .......... | H04N 21/25841 |
| | | | 725/32 |
| 2009/0077580 A1 | 3/2009 | Konig et al. | |
| 2009/0304358 A1 | 12/2009 | Rashkovskiy et al. | |
| 2010/0014594 A1 | 1/2010 | Beheydt et al. | |

| | | | |
|---|---|---|---|
| 2010/0083305 A1 | 4/2010 | Acharya et al. | |
| 2010/0269128 A1 | 10/2010 | Gordon | |
| 2010/0325657 A1* | 12/2010 | Sellers ............. | H04N 21/44016 |
| | | | 725/32 |
| 2011/0194838 A1 | 8/2011 | Meijer | |
| 2011/0197224 A1 | 8/2011 | Meijer | |
| 2011/0296458 A1 | 12/2011 | Di et al. | |
| 2012/0099022 A1 | 4/2012 | Sundy et al. | |
| 2012/0124618 A1 | 5/2012 | Ruiz-Velasco et al. | |
| 2012/0166289 A1 | 6/2012 | Gadoury et al. | |
| 2012/0192222 A1 | 7/2012 | Kumar et al. | |
| 2013/0086631 A1 | 4/2013 | Archer et al. | |
| 2013/0238745 A1 | 9/2013 | Ramachandran et al. | |
| 2013/0262404 A1 | 10/2013 | Daga et al. | |
| 2014/0020013 A1 | 1/2014 | Dilorenzo | |
| 2014/0082659 A1* | 3/2014 | Fife ....................... | H04N 21/812 |
| | | | 725/32 |
| 2014/0115631 A1 | 4/2014 | Mak | |
| 2014/0150019 A1 | 5/2014 | Ma et al. | |
| 2014/0342776 A1 | 11/2014 | Viswanadham et al. | |
| 2015/0032547 A1 | 1/2015 | Malhotra | |
| 2015/0302487 A1 | 10/2015 | Reynolds | |
| 2015/0319479 A1* | 11/2015 | Mishra ................. | H04N 21/439 |
| | | | 725/32 |
| 2015/0339634 A1 | 11/2015 | Xiao et al. | |
| 2015/0339722 A1 | 11/2015 | Hensgen et al. | |
| 2015/0349824 A1 | 12/2015 | Cho et al. | |
| 2016/0149605 A1 | 5/2016 | Vecera et al. | |
| 2016/0316233 A1 | 10/2016 | Ghadi et al. | |
| 2017/0048566 A1 | 2/2017 | Srinivasan | |
| 2017/0048773 A1 | 2/2017 | Miao et al. | |
| 2017/0078715 A1* | 3/2017 | Chao ..................... | H04N 21/235 |
| 2017/0094370 A1* | 3/2017 | Jankowski ......... | H04N 21/2668 |
| 2017/0188115 A1 | 6/2017 | Bafekr | |
| 2017/0208369 A1 | 7/2017 | Major et al. | |
| 2017/0264951 A1 | 9/2017 | Mitra et al. | |
| 2018/0084504 A1 | 3/2018 | Lindoff et al. | |
| 2018/0167853 A1 | 6/2018 | Wang | |
| 2018/0189276 A1 | 7/2018 | Fonseca, Jr. et al. | |
| 2018/0359540 A1 | 12/2018 | Major | |
| 2019/0132630 A1* | 5/2019 | Loheide ........... | H04N 21/23439 |
| 2019/0200065 A1 | 6/2019 | Haberman et al. | |
| 2019/0313135 A1 | 10/2019 | Pathak et al. | |
| 2020/0100097 A1 | 3/2020 | Zheng et al. | |
| 2020/0186862 A1* | 6/2020 | Garner ............. | H04N 21/44204 |
| 2020/0213673 A1 | 7/2020 | Major et al. | |
| 2021/0174715 A1 | 6/2021 | Holloway et al. | |
| 2021/0195392 A1 | 6/2021 | Kojima et al. | |
| 2021/0250430 A1 | 8/2021 | Moon | |
| 2021/0281924 A1* | 9/2021 | Karuppiah ........... | H04N 21/812 |
| 2022/0022014 A1 | 1/2022 | Li et al. | |
| 2022/0053607 A1 | 2/2022 | Rice et al. | |
| 2022/0078514 A1 | 3/2022 | Bustamante et al. | |
| 2022/0086532 A1 | 3/2022 | Major | |
| 2022/0182688 A1 | 6/2022 | Sharma et al. | |
| 2022/0256237 A1* | 8/2022 | Grover ............... | H04N 21/8456 |
| 2022/0286839 A1 | 9/2022 | Zhao et al. | |
| 2022/0295343 A1 | 9/2022 | Pefkianakis et al. | |
| 2022/0321931 A1* | 10/2022 | Panje ................. | H04N 21/2387 |
| 2022/0368441 A1 | 11/2022 | Lee | |
| 2023/0107904 A1 | 4/2023 | Wang et al. | |
| 2024/0098504 A1 | 3/2024 | Demonget et al. | |
| 2024/0188067 A1 | 6/2024 | Zhang et al. | |
| 2024/0370903 A1 | 11/2024 | Ditullio et al. | |
| 2024/0373078 A1 | 11/2024 | Offeman et al. | |
| 2024/0406469 A1 | 12/2024 | Millar et al. | |
| 2025/0324137 A1 | 10/2025 | Baek et al. | |

FOREIGN PATENT DOCUMENTS

| | | |
|---|---|---|
| WO | 2021/051219 A1 | 3/2021 |
| WO | 2022/092805 A1 | 5/2022 |
| WO | 2022/124679 A1 | 6/2022 |

OTHER PUBLICATIONS

Nemalipuri et al., "Advertisement Caching for Targeted Delivery," U.S. Appl. No. 18/488,726, filed on Oct. 17, 2023. (23 pages).

(56)     References Cited

OTHER PUBLICATIONS

Nemalipuri, "Prefetching Advertisements for Streaming Delivery," U.S. Appl. No. 18/449,976, filed on Aug. 15, 2023. (22 pages).
GSMA, "Requirements for Multi SIM Devices," Version 8.0, 3GPP Draft, Mobile Competence Centre (Jul. 1, 2021).
International Search Report and Written Opinion of the International Searching Authority (EPO) issued in PCT Application No. PCT/US2023/074581 on Nov. 29, 2023.
International Search Report and Written Opinion received for PCT Patent Application No. PCT/US23/74585, mailed on Mar. 12, 2024, 18 pages.
Partial International Search Results Communication issued by the European Patent Office as the International Searching Authority in PCT Application No. PCT/US2023/074585 on Jan. 17, 2024.
International Search Report and Written Opinion received for PCT Patent Application No. PCT/US24/46589, mailed on Oct. 24, 2024, 14 pages.

* cited by examiner

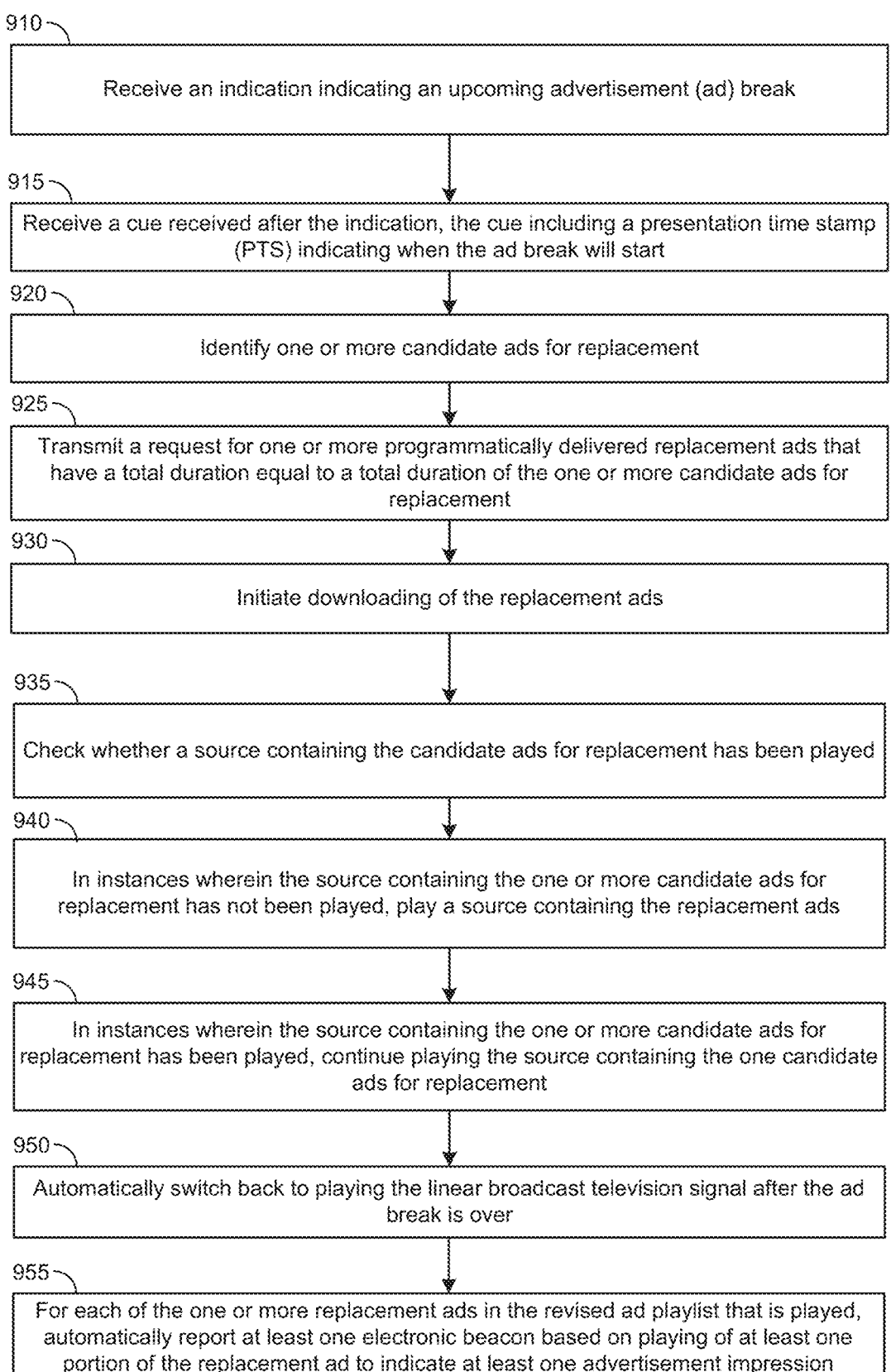

910 — Receive an indication indicating an upcoming advertisement (ad) break

915 — Receive a cue received after the indication, the cue including a presentation time stamp (PTS) indicating when the ad break will start 920 — Identify one or more candidate ads for replacement 925 — Transmit a request for one or more programmatically delivered replacement ads that have a total duration equal to a total duration of the one or more candidate ads for replacement 930 — Initiate downloading of the replacement ads 935 — Check whether a source containing the candidate ads for replacement has been played 940 — In instances wherein the source containing the one or more candidate ads for replacement has not been played, play a source containing the replacement ads 945 — In instances wherein the source containing the one or more candidate ads for replacement has been played, continue playing the source containing the one candidate ads for replacement 950 — Automatically switch back to playing the linear broadcast television signal after the ad break is over 955 — For each of the one or more replacement ads in the revised ad playlist that is played, automatically report at least one electronic beacon based on playing of at least one portion of the replacement ad to indicate at least one advertisement impression

FIG. 9

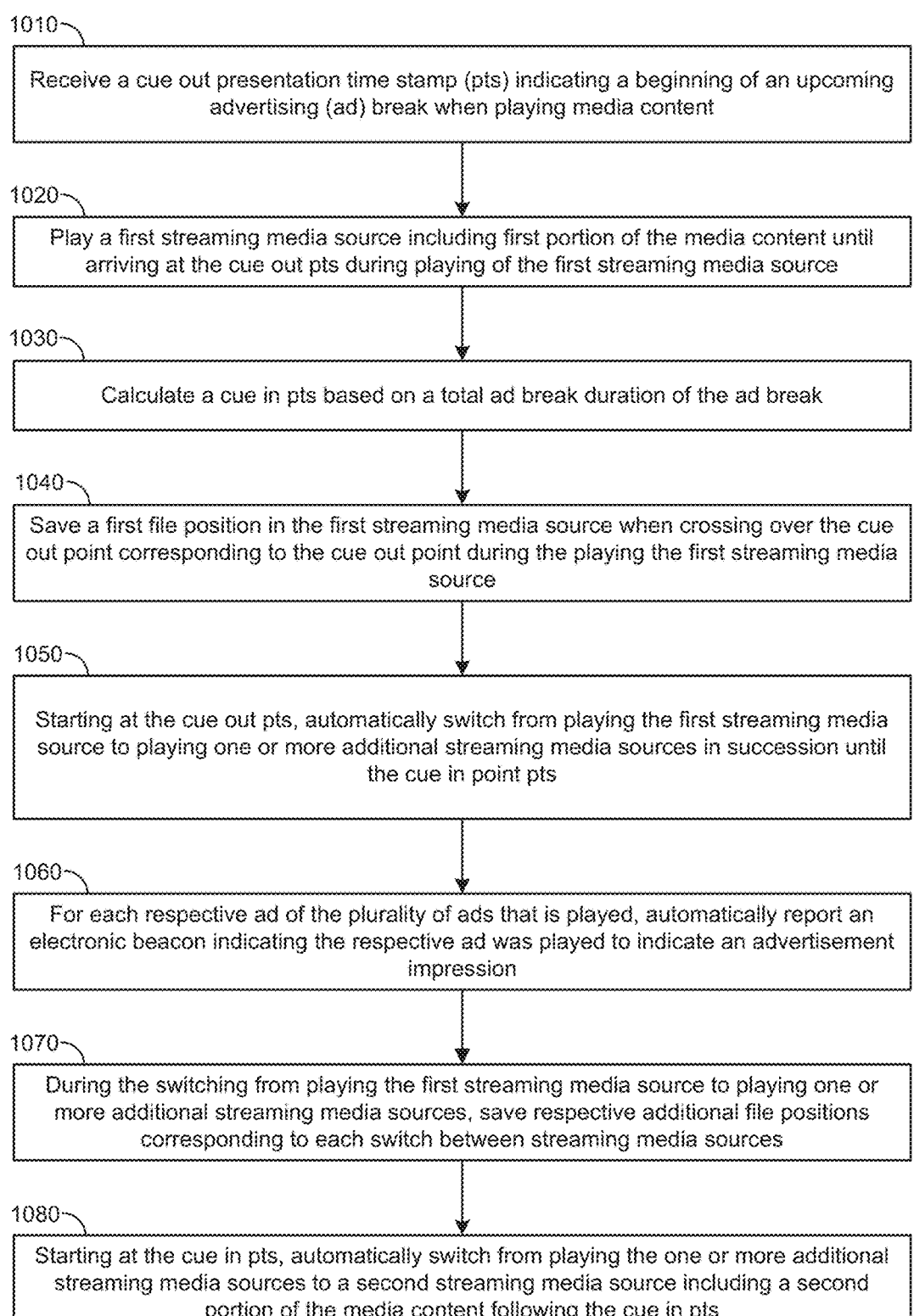

1010

Receive a cue out presentation time stamp (pts) indicating a beginning of an upcoming advertising (ad) break when playing media content

1020

Play a first streaming media source including first portion of the media content until arriving at the cue out pts during playing of the first streaming media source

1030

Calculate a cue in pts based on a total ad break duration of the ad break

1040

Save a first file position in the first streaming media source when crossing over the cue out point corresponding to the cue out point during the playing the first streaming media source

1050

Starting at the cue out pts, automatically switch from playing the first streaming media source to playing one or more additional streaming media sources in succession until the cue in point pts

1060

For each respective ad of the plurality of ads that is played, automatically report an electronic beacon indicating the respective ad was played to indicate an advertisement impression

1070

During the switching from playing the first streaming media source to playing one or more additional streaming media sources, save respective additional file positions corresponding to each switch between streaming media sources

1080

Starting at the cue in pts, automatically switch from playing the one or more additional streaming media sources to a second streaming media source including a second portion of the media content following the cue in pts

*FIG. 10*

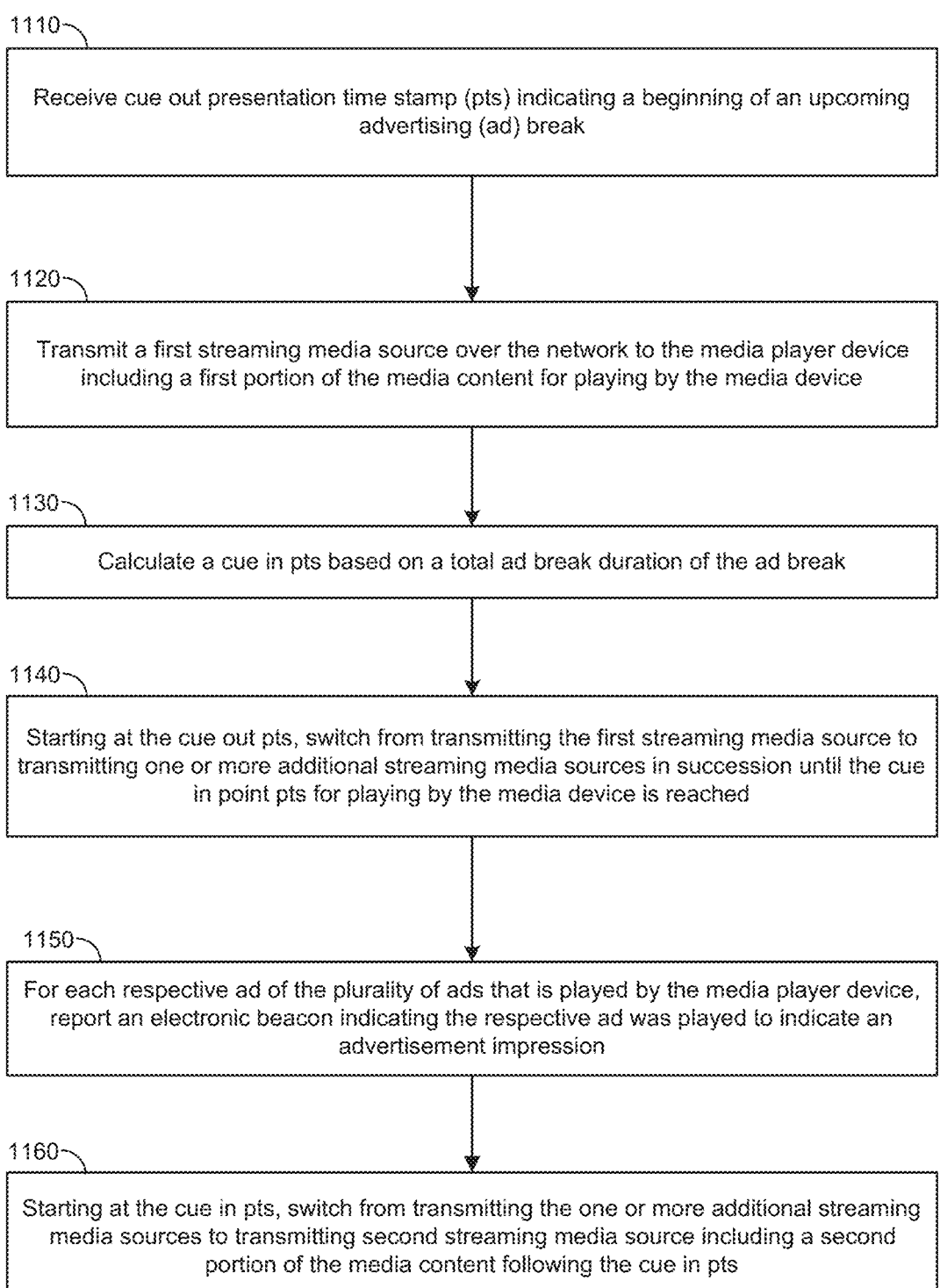

1110

Receive cue out presentation time stamp (pts) indicating a beginning of an upcoming advertising (ad) break

1120

Transmit a first streaming media source over the network to the media player device including a first portion of the media content for playing by the media device

1130

Calculate a cue in pts based on a total ad break duration of the ad break

1140

Starting at the cue out pts, switch from transmitting the first streaming media source to transmitting one or more additional streaming media sources in succession until the cue in point pts for playing by the media device is reached

1150

For each respective ad of the plurality of ads that is played by the media player device, report an electronic beacon indicating the respective ad was played to indicate an advertisement impression

1160

Starting at the cue in pts, switch from transmitting the one or more additional streaming media sources to transmitting second streaming media source including a second portion of the media content following the cue in pts

*FIG. 11*

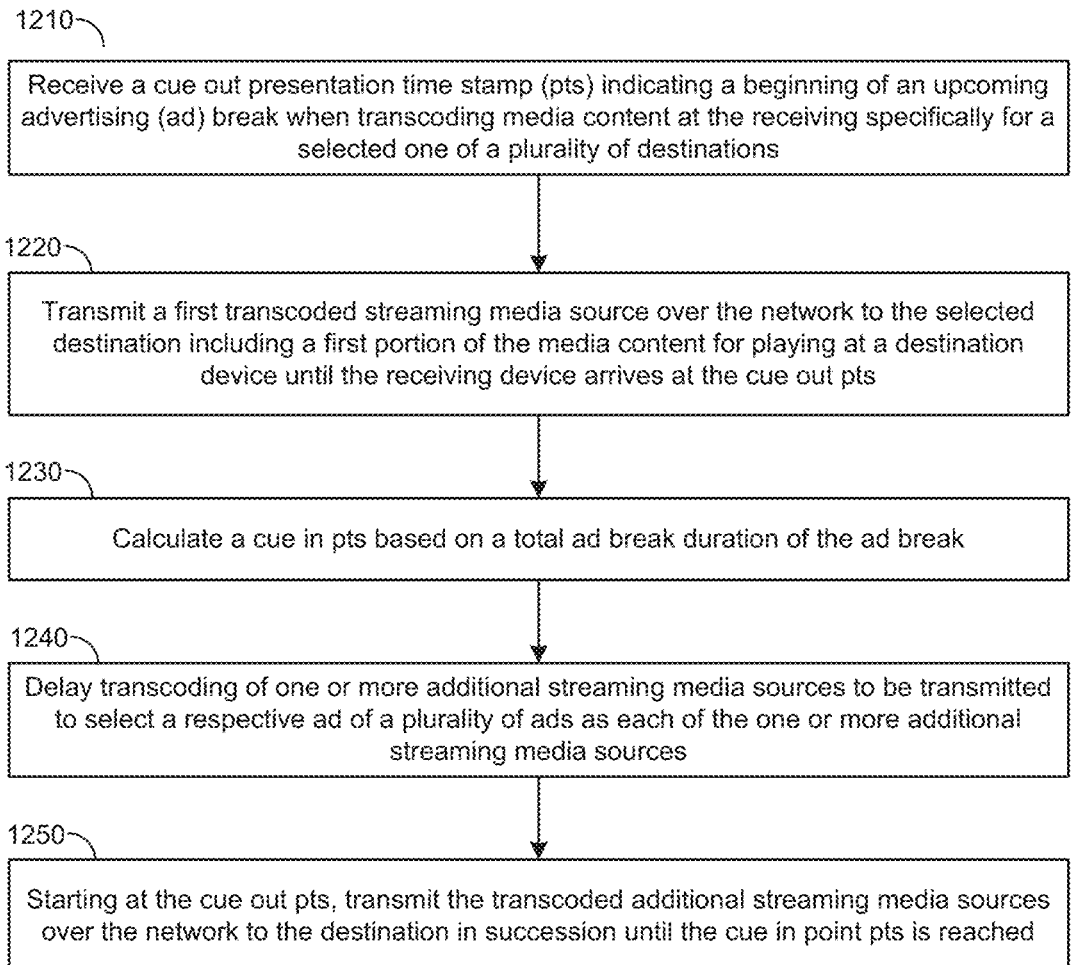

1210

Receive a cue out presentation time stamp (pts) indicating a beginning of an upcoming advertising (ad) break when transcoding media content at the receiving specifically for a selected one of a plurality of destinations

1220

Transmit a first transcoded streaming media source over the network to the selected destination including a first portion of the media content for playing at a destination device until the receiving device arrives at the cue out pts

1230

Calculate a cue in pts based on a total ad break duration of the ad break

1240

Delay transcoding of one or more additional streaming media sources to be transmitted to select a respective ad of a plurality of ads as each of the one or more additional streaming media sources

1250

Starting at the cue out pts, transmit the transcoded additional streaming media sources over the network to the destination in succession until the cue in point pts is reached

*FIG. 12*

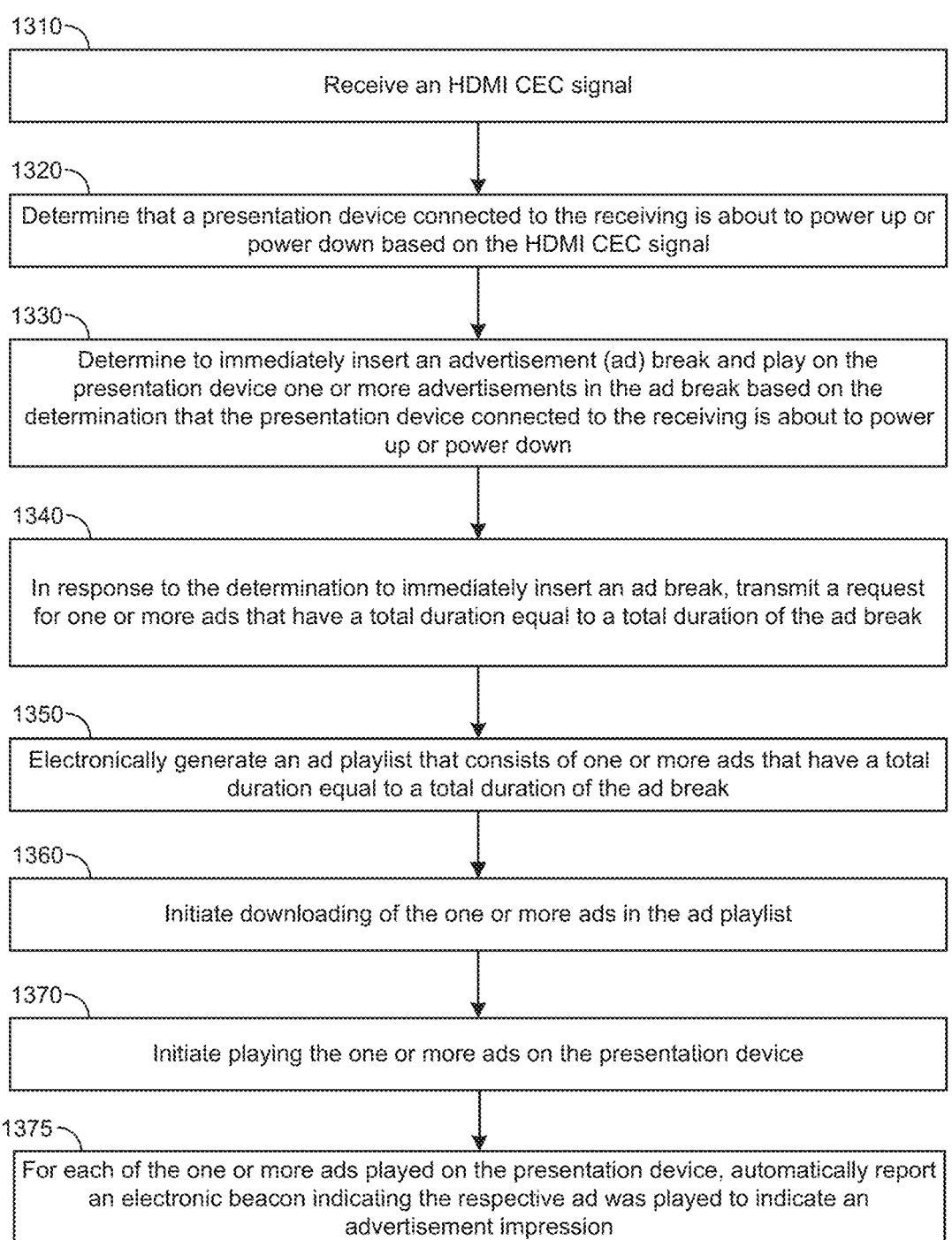

1310 —
Receive an HDMI CEC signal

1320 —
Determine that a presentation device connected to the receiving is about to power up or power down based on the HDMI CEC signal 1330 —
Determine to immediately insert an advertisement (ad) break and play on the presentation device one or more advertisements in the ad break based on the determination that the presentation device connected to the receiving is about to power up or power down 1340 —
In response to the determination to immediately insert an ad break, transmit a request for one or more ads that have a total duration equal to a total duration of the ad break 1350 —
Electronically generate an ad playlist that consists of one or more ads that have a total duration equal to a total duration of the ad break 1360 —
Initiate downloading of the one or more ads in the ad playlist 1370 —
Initiate playing the one or more ads on the presentation device 1375 —
For each of the one or more ads played on the presentation device, automatically report an electronic beacon indicating the respective ad was played to indicate an advertisement impression

FIG. 13

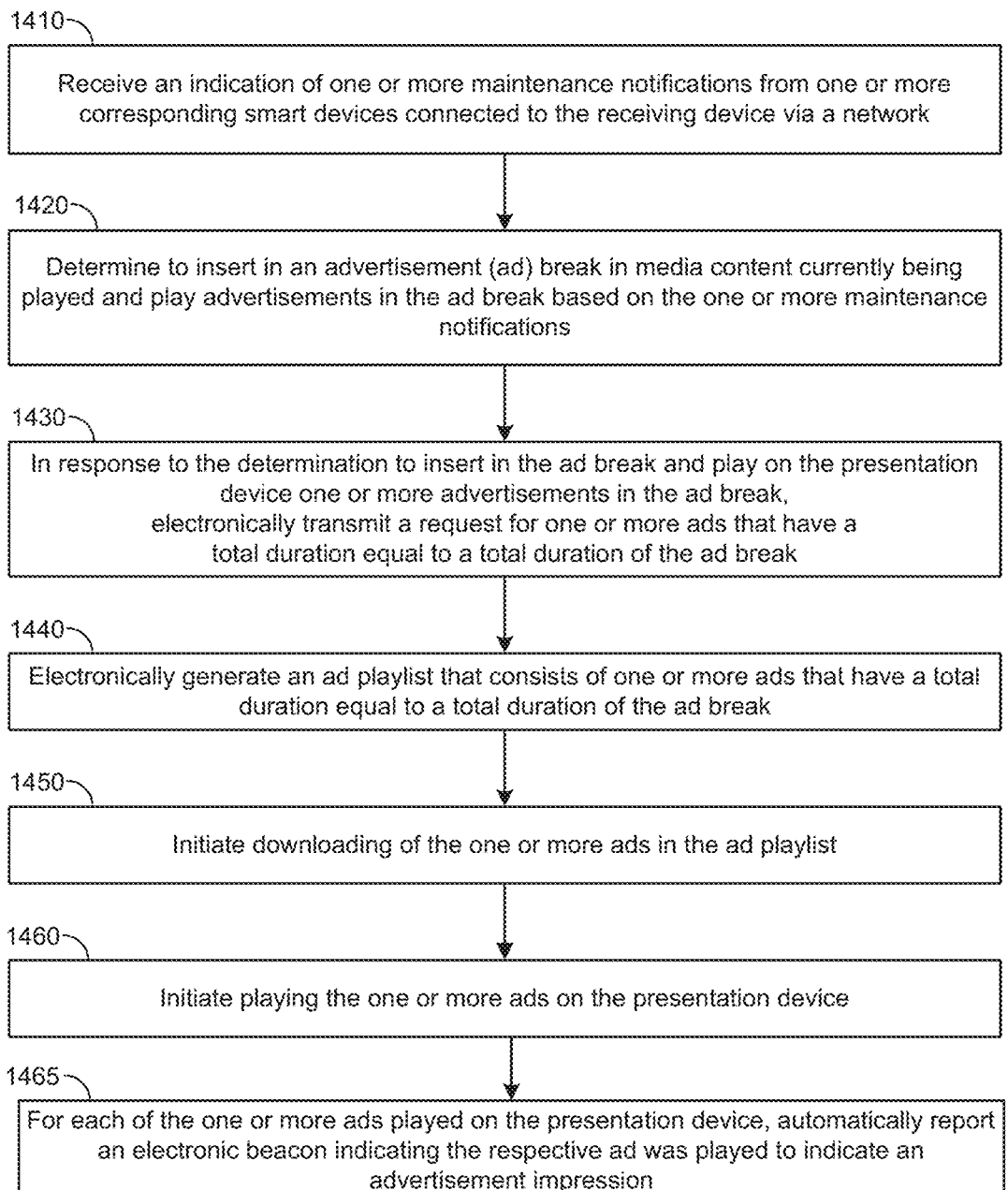

1410 —

Receive an indication of one or more maintenance notifications from one or more corresponding smart devices connected to the receiving device via a network

1420 —

Determine to insert in an advertisement (ad) break in media content currently being played and play advertisements in the ad break based on the one or more maintenance notifications

1430 —

In response to the determination to insert in the ad break and play on the presentation device one or more advertisements in the ad break, electronically transmit a request for one or more ads that have a total duration equal to a total duration of the ad break

1440 —

Electronically generate an ad playlist that consists of one or more ads that have a total duration equal to a total duration of the ad break

1450 —

Initiate downloading of the one or more ads in the ad playlist

1460 —

Initiate playing the one or more ads on the presentation device

1465 —

For each of the one or more ads played on the presentation device, automatically report an electronic beacon indicating the respective ad was played to indicate an advertisement impression

*FIG. 14*

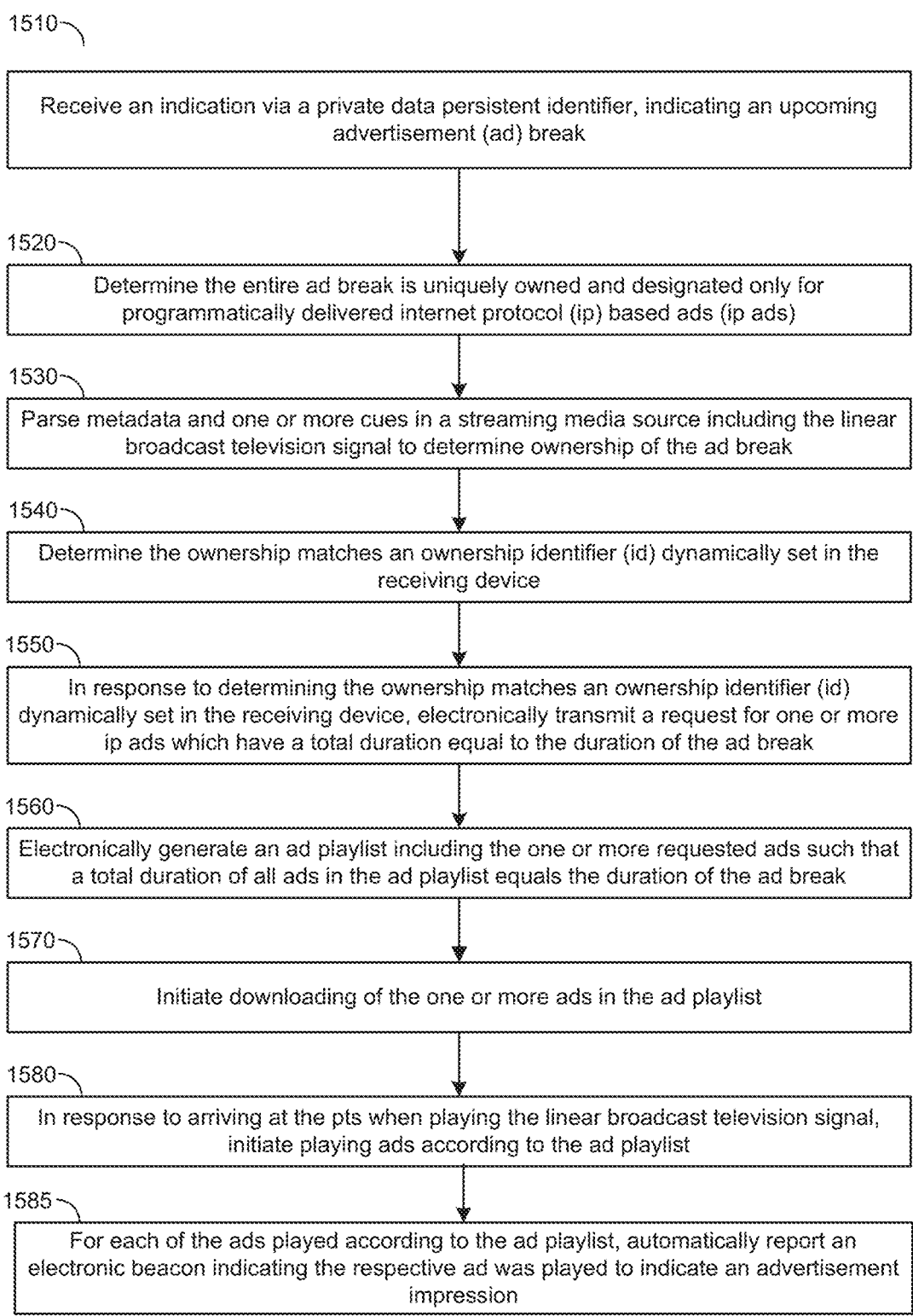

1510

Receive an indication via a private data persistent identifier, indicating an upcoming advertisement (ad) break

1520

Determine the entire ad break is uniquely owned and designated only for programmatically delivered internet protocol (ip) based ads (ip ads)

1530

Parse metadata and one or more cues in a streaming media source including the linear broadcast television signal to determine ownership of the ad break

1540

Determine the ownership matches an ownership identifier (id) dynamically set in the receiving device

1550

In response to determining the ownership matches an ownership identifier (id) dynamically set in the receiving device, electronically transmit a request for one or more ip ads which have a total duration equal to the duration of the ad break

1560

Electronically generate an ad playlist including the one or more requested ads such that a total duration of all ads in the ad playlist equals the duration of the ad break

1570

Initiate downloading of the one or more ads in the ad playlist

1580

In response to arriving at the pts when playing the linear broadcast television signal, initiate playing ads according to the ad playlist

1585

For each of the ads played according to the ad playlist, automatically report an electronic beacon indicating the respective ad was played to indicate an advertisement impression

FIG. 15

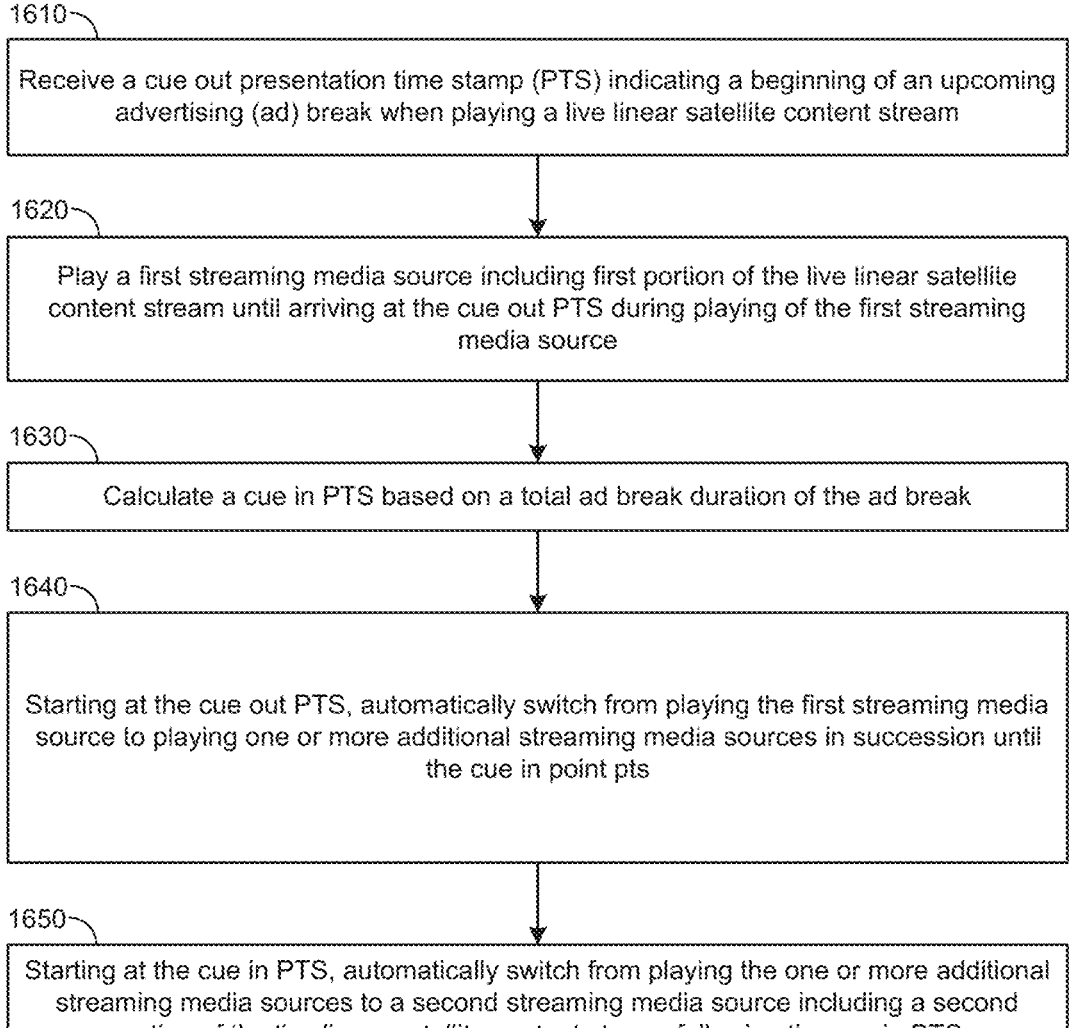

1610
Receive a cue out presentation time stamp (PTS) indicating a beginning of an upcoming advertising (ad) break when playing a live linear satellite content stream 1620
Play a first streaming media source including first portion of the live linear satellite content stream until arriving at the cue out PTS during playing of the first streaming media source 1630
Calculate a cue in PTS based on a total ad break duration of the ad break 1640
Starting at the cue out PTS, automatically switch from playing the first streaming media source to playing one or more additional streaming media sources in succession until the cue in point pts 1650
Starting at the cue in PTS, automatically switch from playing the one or more additional streaming media sources to a second streaming media source including a second portion of the live linear satellite content stream following the cue in PTS

Host Computer System(s)

1702

Memory

1704

Control Module

1710

Other Programs and Data

1714

CPU

1718

I/O Interfaces

1720

Other Computer Readable Media

1722

Network Connections

ADDRESSABLE ADVERTISEMENT AND PROGRAMMATICALLY DELIVERED ADVERTISEMENT INSERTION AND PLAYING

TECHNICAL FIELD

The present disclosure relates to playing of media assets, and in particular to systems and methods for addressable advertisement and programmatically delivered advertisement insertion and playing.

BRIEF SUMMARY

In many contexts, addressable television advertising is the ability to show different ads to different households while they are watching the same program. Addressable advertisements may be based on anonymous device-level profiles that are matched to an advertiser's desired characteristics. With addressable advertising, advertisers are enabled to deliver targeted ads through addressable-enabled cable, satellite, and telecommunication video content networks to reach particular types of viewers regardless of what, how, and when they are watching. With the help of addressable advertising, advertisers can move beyond large-scale traditional TV advertisement (ad) buys, to focus on relevance and impact. In particular, addressable TV advertising allows advertisers to reach more specific audiences with greater creative flexibility.

However, such spots available for addressable ads are not always purchased and filled with such personalized addressable ads. In such instances, those ad spots may by default be filled with TV advertisements that are continually running instead of being targeted to such specific audiences at such specific times, and which are instead focused on staying relevant for a long time period (often referred to as "evergreen" or "filler" ads). In particular, such evergreen ads may have not been previously selected based on a particular receiving device, media player device or associated user receiving the content. Evergreen ads may have little or no monetary value for being played. This results in missed ad revenue opportunities for the content provider, television network and/or television service provider. Furthermore, one or more ads in an ad playlist may be candidate ads for replacement for other reasons and the candidate ads for replacement need not be specifically evergreen or filler ads.

Thus, in order to solve the above problem, systems and methods are disclosed herein for addressable ad and programmatically delivered ad insertion and playing. In an example embodiment, the candidate ads for replacement are replaced in real time with programmatically delivered Internet Protocol (IP) based ads (IP ads). IP ads may be ads that target audiences based on IP address or location indicated by IP address. The IP ads may also be ads that target audiences based on their individual demographics such as age category, income ranges, gender, education level, occupation, or number of people in the household, etc. For example, upon encountering an indication of an upcoming ad break including one or more candidate ads for replacement 120 in an addressable ad slot, an ad request may be automatically transmitted that puts those evergreen ad spots up for bidding by various advertisers, and then such ads may be replaced by IP ads that in total have a duration equal to the duration of the candidate ads for replacement being replaced. Such IP ads (also referred to herein as dynamic ad insertion (DAI) ads) may be based on, among other things, a user's or household's receiving device 102 location, a current channel a particular receiving device at that location is tuned to, a particular program that is playing on that channel, a genre of the program, etc. The selected IP ad(s) are then, in real time, seamlessly inserted or "stitched", as described herein, into a media content stream comprising or consisting of the television programming (e.g., live linear satellite (SAT) stream) or other media content stream. Such stitched content may then be played back or stored (e.g., on the receiving device). In various embodiments, the solution described herein provides a consistent playout of all types of ads across various different media content service provider platforms and technologies which have different processing capabilities and different associated service level agreement (SLAs) and service-level contracts (SLCs). Additional features and techniques, as described herein, using or based on such seamless stitching technology may also be implemented in various embodiments.

BRIEF DESCRIPTION OF THE SEVERAL VIEWS OF THE DRAWINGS

FIG. 9 is a flowchart illustrating a method for replacing addressable ads with programmatically delivered ads, according to various embodiments described herein.

FIG. 10 is a flowchart illustrating a method for seamlessly stitching programmatically delivered ads into a content media stream, according to various embodiments described herein.

FIG. 11 is a flowchart illustrating a method for a receiving device 102 requesting and stitching ads for media player device connected to receiving device 102 over a network, according to various embodiments described herein.

FIG. 12 is a flowchart illustrating a method for ad insertion by a receiving device 102 providing a customer based and platform independent streaming service from the receiving device, according to various embodiments described herein.

FIG. 13 is a flowchart illustrating a method for using an HDMI CEC signal to know when a presentation device is being powered down and/or powered up and download and insert an ad before the presentation device powers down and upon it powering up, according to various embodiments described herein.

FIG. 14 is a flowchart illustrating a method for using maintenance notifications from smart devices to initiate playing relevant ads on a presentation device, according to various embodiments described herein.

FIG. 15 is a flowchart illustrating a method for implementing an entire ad break that is uniquely owned and designated only for programmatically delivered Internet Protocol (IP) based ads (IP ads), according to various embodiments described herein.

FIG. 16 is a flowchart illustrating a method for making a service providing a live linear satellite broadcast content stream free to a consumer by lengthening by inserting additional ads into a live linear satellite broadcast program, according to various embodiments described herein.

DETAILED DESCRIPTION

In the following description, certain specific details are set forth in order to provide a thorough understanding of various disclosed embodiments. However, embodiments may be practiced without one or more of these specific details, or with other methods, components, materials, etc. Well-known structures and methods associated with media content delivery, or repeated corresponding methods, components, materials, etc., have not been shown or described in detail (or have been shown in the Figures, but not described or referenced in detail in the detailed description) to avoid unnecessarily obscuring descriptions of the preferred embodiments. Some individual components and methods familiar to those of ordinary skill in the art are shown in the Figures for various corresponding devices to provide context, but are not referenced or described in detail in the detailed description so as not to obscure the disclosure with details that will be readily apparent to those of ordinary skill in the art having the benefit of the description herein.

Unless the context requires otherwise, throughout the specification and claims which follow, the word "comprise" and variations thereof, such as, "comprises" and "comprising" are to be construed in an open, inclusive sense, for example, "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
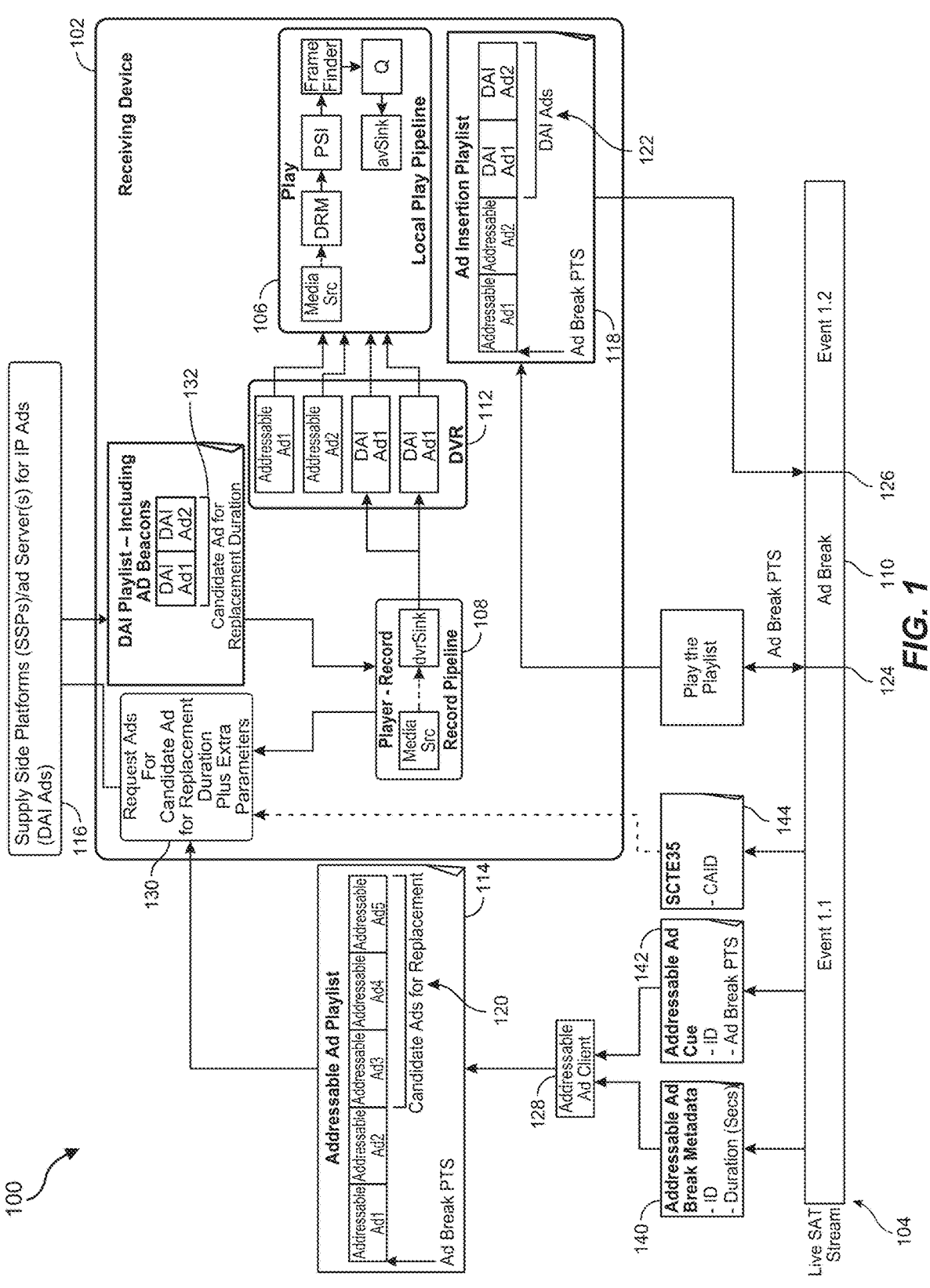
FIG. 1 is an overview block diagram illustrating an example system for programmatically delivered advertisement (ad) insertion and playing, according to various embodiments described herein.

FIG. 1 is an overview block diagram illustrating an example system 100 for programmatically delivered advertisement (ad) insertion and playing, according to various embodiments described herein.

Shown is a receiving device 102 that may receive, stream and play media content, such as, for example, live linear satellite (SAT) broadcast television content 104 (also referred to herein as live SAT stream 104), over-the-top (OTT) media content, live linear OTT (LLOTT) media content, video-on-demand (VOD) media content, Internet Protocol (IP) video on demand (IPVOD) media content, Hypertext Transfer Protocol (HTTP) live streaming (HLS) media content, MPEG-1 Audio Layer 3 (MP3) media content, MPEG-4 Part 14 (MP4) media content, Real Time Streaming Protocol (RTSP) media content and other types of media content delivered via various streaming media formats and protocols. In various embodiments, examples of a receiving device 102 may include or be integrated with, one or a combination of the following: a "television converter," "receiver," "set-top box (STB)", "television receiving device 102," "television receiver," "television," "television recording device," "satellite set-top box," "satellite receiver," "cable set-top box," "cable receiver," "media player", "digital video recorder (DVR)", "computer", "mobile device", "tablet computer", "smart phone", "handheld computer", and/or "television tuner", "automotive entertainment system" etc. Accordingly, the receiving device 102 may include any suitable converter device or electronic equipment that is operable to receive programming via a connection to a satellite or cable television service provider outside a user premises or via terrestrial broadcast, such as an Advanced Television Systems Committee (ATSC) broadcast, and communicate that programming to another device over a network. Further, the receiving device 102 may itself include user interface devices, such as buttons or switches.

In an example embodiment, the receiving device 102 provides capabilities to insert Internet Protocol (IP) based advertisements (IP ads 122) on satellite streams. IP ads 122 may be ads that target audiences based on IP address or location indicated by IP address. In various embodiments, the IP ads 122 may also be ads that target audiences based on their individual demographics such as age category, income ranges, gender, education level, occupation, or number of people in the household, service zip code, etc. The system 100 may be enabled to do so by the receiving device 102 implementing a local play pipeline 106 106 (a "PLAY" pipeline). The play pipeline 106 may be made up of streamer plugins that each have a single function and deal with the flow of audio-visual (AV) data to the end user. The functionality of each pipeline is dynamically configured at runtime based on the type of content that is being played. The local play pipeline 106 may comprise of various components including, but not limited to, a mediaSrc component, a Digital Rights Media (DRM) module, a program stream information (PSI) component, a Framefinder component, a Buffer Q component and an AVsink component.

The MediaSrc component deals with loading of the content into the pipeline 106. This supports Hyper Text Transfer Protocol (HTTP) live streaming (HLS), MPEG-1 Audio Layer 3 (MP3), MPEG-4 Part 14 (MP4), Real Time Streaming Protocol (RTSP) and Digital Video Recorder (DVR) files (via HLS), and also supports multiple source playback and seamless stitching of content. The DRM module handles DRM and decryption of content. The PSI component finds program stream information in the stream to allow playback of content. The Framefinder component finds frames and performs syncing to I-frames. The Buffer Q component is internal memory to allow streaming without a hard disk drive (HDD) and buffering logic with or without a HDD. The AVsink component handles writing audio and video (AV) packets to the hardware, discontinuities for ads (such as discontinuity 230 and discontinuity 232 shown in FIG. 2) and buffer level monitoring.

A "RECORD" pipeline 108 may comprise of streamer plugins that handle the download of video streams and record in the original DRM format to DVR. In an example embodiment, components of the RECORD pipeline may include mediaSrc, which is the same as used in a play pipeline 106 and dvrSink, which handles recording of the AV file and metadata to the DVR 112.

In an example embodiment, the system 100, via an addressable ad client 128, may replace candidate ads for replacement 120 designed to be continually running instead of being used for a specific campaign or promotion (e.g., ads that were not previously selected based on a particular receiving device 102 receiving the linear broadcast television signal and were not previously selected based on a particular user account associated with the receiving device 102) in a playlist 114 of addressable ads with programmatically delivered (e.g., IP based) ads, as shown in addressable ad playlist 118. In order to facilitate replacing such ads, the addressable ad client 128 may receive addressable ad break metadata 140 (e.g., including an ad identifier (ID) and duration (in seconds)) from the live SAT stream 104 and also receive an addressable ad cue 142 (e.g., including an ad ID and an ad break presentation timestamp (PTS). The live SAT steam 104 may also include SCTE-35 (ANSI/SCTE 35 2013) messages 144 for ad breaks, which may include ad break metadata such as the content identifier (CAID). SCTE-35 is a joint ANSI/Society of Cable and Telecommunications Engineers standard that describes the inline insertion of cue tones in MPEG transport stream (TS) streams. The full standard name is "Digital Program Insertion Cueing Message for Cable". Such SCTE-35 ad break metadata may also be used by and/or to facilitate the ad request 130 for ads to replace the candidate ads for replacement 120. Some embodiments may use the information from both addressable ad break metadata 140 and addressable ad cue 142 to implement ad replacement, whereas other embodiments may instead use information from addressable ad cue 142 without using the information addressable ad break metadata 140.

An example of an addressable ad is that which is provided by INVIDI Technologies Corporation (Invidi), which is a company that provides a technology platform to access to and serve addressable advertisements from distributors for live, Video on Demand (VOD), Over the Top (OTT), and mobile media content delivery technologies. As used herein "Invidi" represents a specific example of using the technology platform provided by Invidi for addressable ads. However, other platforms may also be used to access such addressable ads. For example, this replacement process may include: receiving a signal regarding an upcoming addressable ad break including ad ID, duration of ad break, and ad break presentation time stamp (PTS); when getting to the ad break, getting addressable ad playlist 114 and detecting the candidate ads for replacement 120 in the playlist 114 (which may in some embodiments include all the ads in the playlist); calculating the duration of the candidate ads for replacement 120 that need to be replaced; making an ad request 130 to one o more backend systems, such as to supply side platforms (SSPs)/ad server(s) for IP ads (DAI ads) 116, for IP ads 122 to fill the duration 132 of candidate ads for replacement 120 that need to be replaced.

IP ads 122 may be selected based on current channel, program, genre (all indicated in session). The ad request 130 may be based on what show is being watched, the exact episode being watched, which box is being used, and may be highly customizable ads. Certain channels can be enabled/disabled for IP ad insertion (e.g., CNN can approve and FOX can disapprove), which facilitates implementation of the process on a per channel basis. Ads can be customized to the receiving device 102 (e.g., there may be many shows on a media player device related to a first type of content (e.g., pets) so the system 100 may send them ads related to that first type of content (e.g., related to pets)).

The receiving device 102 then starts downloading requested IP ads (meanwhile the receiving device 102 (e.g., a set-top box (STB)) is playing the event and gets to the ad break). The receiving device 102 selects which profile of the ad (from ad profiles of varying bit rates) to download based on available network bandwidth and saves it as a fixed bit rate stream on player (e.g., receiving device 102).

The system 100 implements specific processes and functionalities that ensure the seamless integration and playback of various types of ads. One such implementation allows the system 100 to begin downloading ads as much as about 20-50 minutes before they are needed, although in some embodiments, this can be as short as between about four and ten seconds before the ad break in response to receiving the cue including the PTS. In the example embodiment in which the system 100 begins downloading ads as much as about 20-50 minutes before they are needed, the candidate ads for replacement and the revised ad playlist may include all the ads included in the initial ad playlist and the transmitting of the request and the initiating downloading of the replacement ads occurs in response to receiving an indication indicating an upcoming ad break, which includes a duration of the ad break and identifies an initial ad playlist including addressable ads initially intended to be played during the ad break. The system 100 then receives the cue after the indication, in which the cue includes the PTS indicating when the ad break will start. This flexibility in timing enables the system 100 to request higher bitrate quality ads if the download is initiated well in advance, enhancing the overall viewing quality.

In the example embodiment in which the system 100 begins downloading ads between about four and ten seconds before the ad break in response to receiving the cue including the PTS, the one or more candidate ads for replacement and the revised ad playlist may include a subset the ads included in the initial ad playlist and the transmitting of the request and the initiating downloading of the replacement ads occurs in response to receiving the cue including the PTS.

In an example embodiment, if a user changes the channel, the system immediately cancels the ad download that was in progress for the previous channel. This ensures that bandwidth and resources are not wasted on ads that will no longer be viewed. As viewers approach an ad break, the system 100 automatically transitions from the regular programming to playing addressable ads that have been downloaded.

The operation of the system 100 during ad breaks is finely tuned. If the receiving device 102 has managed to download all IP ads 122 before the commencement of candidate ads for replacement 120, the system 100 will replace these candidate ads for replacement 120 with the downloaded IP ads 122 shown in the ad insertion playlist 118. If not all IP ads 122 are ready, the system continues to play candidate ads for replacement 120, foregoing the insertion of IP ads 122.

After the ad break 110, the system 100 seamlessly switches back to the live SAT linear stream 104. This switch is from the playlist 118 containing the IP ads 122 that replaced the candidate ads for replacement 120. To monitor ad performance and engagement, the system 100 electronically files a report or beacon for each IP ad impression played. In an example embodiment, for each one or more replacement ads in a revised ad playlist that is played, the system automatically reports or receives at least one electronic beacon based on playing of at least one portion of the replacement ad to indicate at least one advertisement impression. In one example implementation, the system may generate, report or receive (e.g., from a third-party system) the following for each ad request. A tracking event-slot impression-one per ad break, is fired (generated) when an ad break playout starts. This impression may be used by digital ad platforms (e.g., FreeWheel™) to calculate avails. A default impression-one per ad in the ad break, but there may be multiple default impressions for the same ad also. This is fired when the ad starts playing (e.g., within the first 1-2 seconds of an ad). This impression is used for billing purposes. Tracking Events-one per ad in the ad break, but there might be multiple tracking events/quartile impressions for the same ad also. A first quartile impression is fired when 25% of an ad is played. A midpoint impression is fired when 50% of an ad is played. A third quartile impression is fired when 75% of an ad is played. A complete impression is fired when 100% of an ad is played. A backend process adds one slot impression per ad break and one default impression/4 tracking quartile impression for each ad also. This may be used for internal monitoring and reporting. Whenever there is an impression discrepancy with an advertiser data generated by the system may be used our data for comparison.

In various embodiments, several factors may influence the decision by system 100 to download IP ads 122. Firstly, a minimum broadband speed threshold, for instance, 10 Mbps, may be required to start the download process. Additionally, it may be required that the channel must be enabled for IP ad insertion to allow for these downloads. Also, when there is a channel change, the system will wait for the signaling for the next ad break (e.g., the indication including the duration of the ad break and the initial ad playlist and the cue including the PTS indicating when the ad break will start) on that channel, and in response will then generate a new ad request specific to that ad break on that new channel.

IP ads 122 have the capability to be cached on (SSPs)/ad server(s) for IP ads (DAI ads) 116, as depicted in FIG. 1 (e.g., for up to four hours). These platforms provide automated services to link advertisers, content providers, and television service providers. If there are no bids on ads (and thus the system 100 does not receive any paid ads) the system can substitute candidate ads for replacement 120 (e.g., evergreen ads) with these cached IP ads 122.

The pacing of content reading from the Digital Video Recorder (DVR) 112 is also important. The system 100 adjusts the pace at which data is read from the DVR 112 to ensure that the signal containing addressable ad break metadata is properly synchronized. This synchronization ensures the IP ads 122 are received before the PTS is reached.

A Dynamic ad insertion (DAI) ad request (e.g., an ad request for a programmatically delivered IP ad), may be made via (SSPs)/ad server(s) for IP ads (DAI ads) 116. The system 100 also provides Video Ad Serving Template (VAST) tag parsing and beacon/impression bundling of addressable and programmatically delivered ads (e.g., addressable ads and DAI (e.g., IP) ads) playback and reporting, as well as a DAI ad fallback for poor network customers.

The ad insertion may be implemented by the receiving device 102 performing seamless stream stitching, which, in some embodiments, seamlessly stitches programmatically delivered (IP) ads into linear satellite (SAT) stream. In an example embodiment, the process may include a chunking and stitching process (which accounts for rewind and playing back (trick play) using delay buffer). For example, this chunking and stitching process may include the following operations below performed by the system 100.

The system 100 virtually chunks the linear content source prior to the ad break, playing the linear piece up to the PTS cue out point 124. The cue out point indicates a point in the content being currently received and played at which a switch to a playing different content stream shall occur. For example, when receiving and playing a movie, the cue out point will indicate when in the movie to play an ad break to show ads.

Post-ad break, the system 100 calculates the cue-in PTS based on the ad break duration and virtually chunks the linear source content that follows this cue-in point. The system 100 saves the file position when crossing over the cue out point during playback.

Starting at the PTS cue out point 124, the system 100 inserts the downloaded ads, playing them according to the playlist 122 as separate sources for each ad in sequence. The file position is saved again when crossing over the cue-in point 126 PTS. The cue in point 126 indicates a point in the content being currently received and played at which a switch back to a playing a program that was previously being received via another video stream is to be performed. For example, the cue in point 126 will indicate at which point to switch back to playing a stream including a movie after an ad break is finished.

The virtually chunked remainder of the linear content is then played at the cue-in point 126 PTS. The saved file positions are used during rewinding and playback from the delay buffer to play virtually chunked linear pieces and ads again without needing to search for the file position.

In some embodiments, instead of using cues, the system may detect ads in streaming media using fingerprinting, content signature techniques and/or other techniques that detect particular content (including advertisements) in streaming media in real time, such as, for example those described in U.S. patent application Ser. No. 17/827,211, filed on May 27, 2022, titled "DETECTING CONTENT OF INTEREST IN STREAMING MEDIA, which is hereby incorporated by reference in its entirety. In various different embodiments, such detection may occur in real time via a server remote from the receiving device 102 or be performed by the receiving device 102.

In an example embodiment, the same ad is played again after rewinding over it and playing and the same beacon is reported/filed again. The system may also provide options to watch multiple episodes of a show (e.g., binge watching), with episodic ad insertions occurring therein, such as IP or file based advertising inserted via the chunking and stitching process after the end of DVR or IPVOD episodic content and in between the playback of multiple sequential episodes.

In an example embodiment, for Video on Demand (VOD) implementation, a modified system (including by implementing the chunking and stitching process) can make a 30 minute show 45 minutes long with ads added to the stream. In particular, a service provider with such a system may offer its customers access to IP VOD (IPVOD) programming by controlling the stream that they receive using pre-roll, post roll and selected additional breaks. The system uses the chunking and stitching process to ingest multiple media sources, add advertising, and then output or stream content to an appropriate presentation device or remote device. This may involve a partnership with content providers, such as a revenue share of advertising between the content provider and the television service provider (e.g., 80%/20%, or other such amount as appropriate). Thus, would allow the television service provider to alter the presentation of the original content, transforming, in a VOD implementation, a 30 minute episode into a 45 minute stream with ads.

Figure 2:
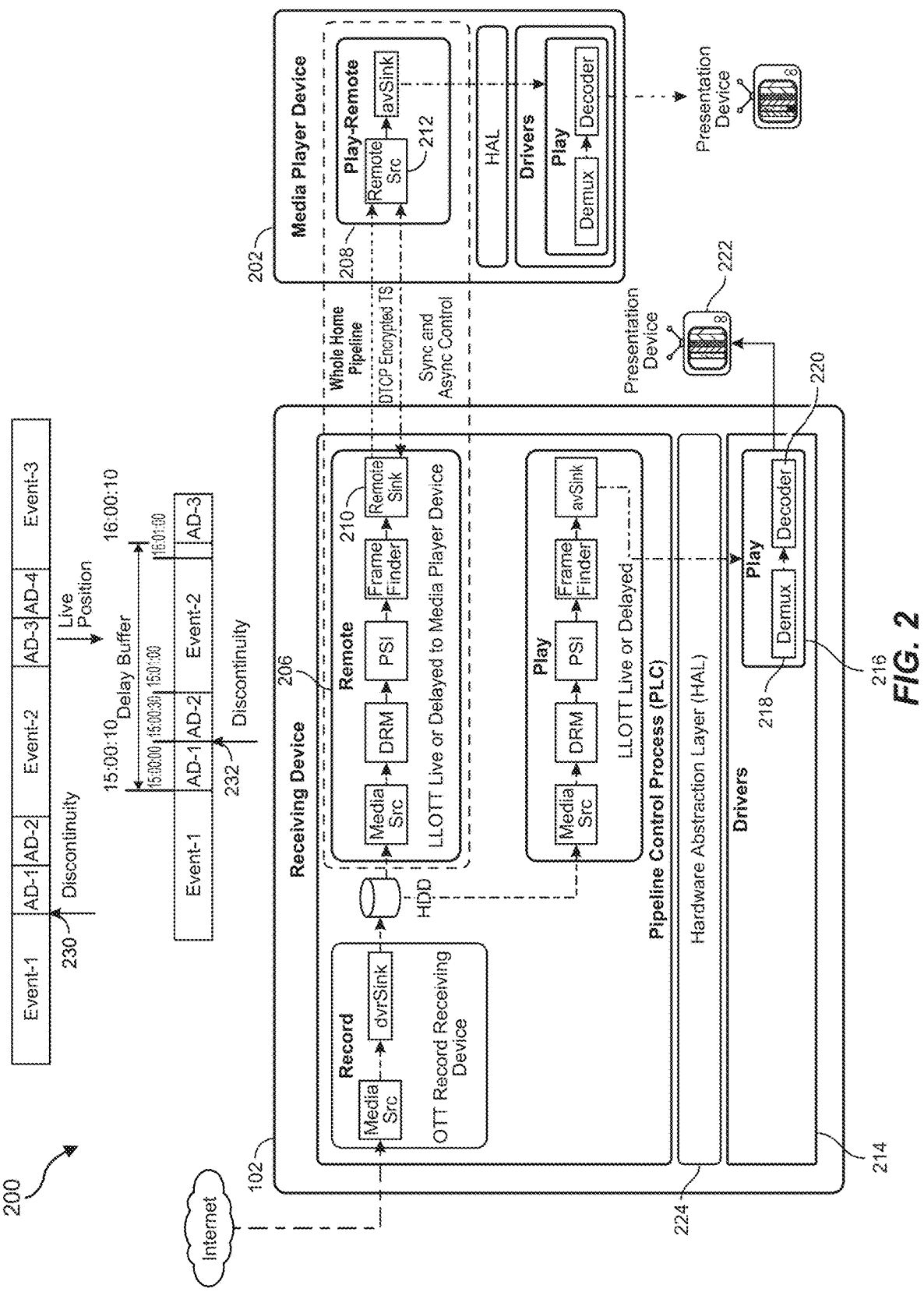
FIG. 2 is an overview block diagram illustrating an example system providing over-the-top (OTT) media delivery in which a system for addressable and programmatically delivered ad insertion and playing in OTT media may be implemented, according to various embodiments described herein.

FIG. 2 is an overview block diagram illustrating an example system 200 providing over-the-top (OTT) media delivery in which a system for addressable and programmatically delivered ad insertion and playing in OTT media may be implemented, according to various embodiments described herein.

In an example embodiment, a common "whole home solution" (including remote play on the media player device 202) is shown and deployed in production, for streaming the following content: IPVOD, LLOTT HLS, MP3, MP4, and RTSP. The system 200 supports the following capabilities: DAI playback and reporting, whole home (all receiving device 102s and connected media player devices), HLS Trickmodes, conditional access system (CAS), persistent rights management (PRM) and provides the following benefits: a unified playback solution (implement once), a modular architecture, synchronous ad insertion solution and a shared delay buffer. Examples of CAS and DRM include the Nagra PRM and Nagra CAS, provided by Kudelski SA of Chesaux, Switzerland. Other examples of PRM and CAS include Widevine DRM from Google and Playready DRM from Microsoft.

In an example embodiment, the "whole home" pipeline may comprise two streamer pipelines (pipeline 206 and pipeline 208) with a remote link between the two that allows for the two pipelines to behave similar to the single play pipeline 106. In an example embodiment, the components within the whole home pipeline are the same as a play pipeline 106 with the exception of: remoteSink 210, which communicates streamer buffers, events and queries to the remote device and remoteSrc 212, which receives video buffers, handles AV decryption and synchronous and asynchronous events and queries.

Both remoteSink and 210 remoteSrc 212 combined allow for upstream and downstream events and queries with an encrypted video stream to allow for a single playback mechanism to be allowed for both Local and Remote playback (playback on the media player device).

Shown also is a hardware abstraction layer (HAL) 224 and drivers 214 for receiving device 102. Drivers 214 include a content play driver 216 having a corresponding demultiplexer 218 and decoder 220 outputting content for presentation on presentation device 222 connected to receiving device 102. Various other corresponding HALs, drivers, demultiplexers, decoders, connected presentation devices and other components art are shown in the Figures for various corresponding devices to provide context, but are not referenced and described in detail so as not to obscure the disclosure with details that will be readily apparent to those of ordinary skill in the art having the benefit of the description herein.

Figure 3:
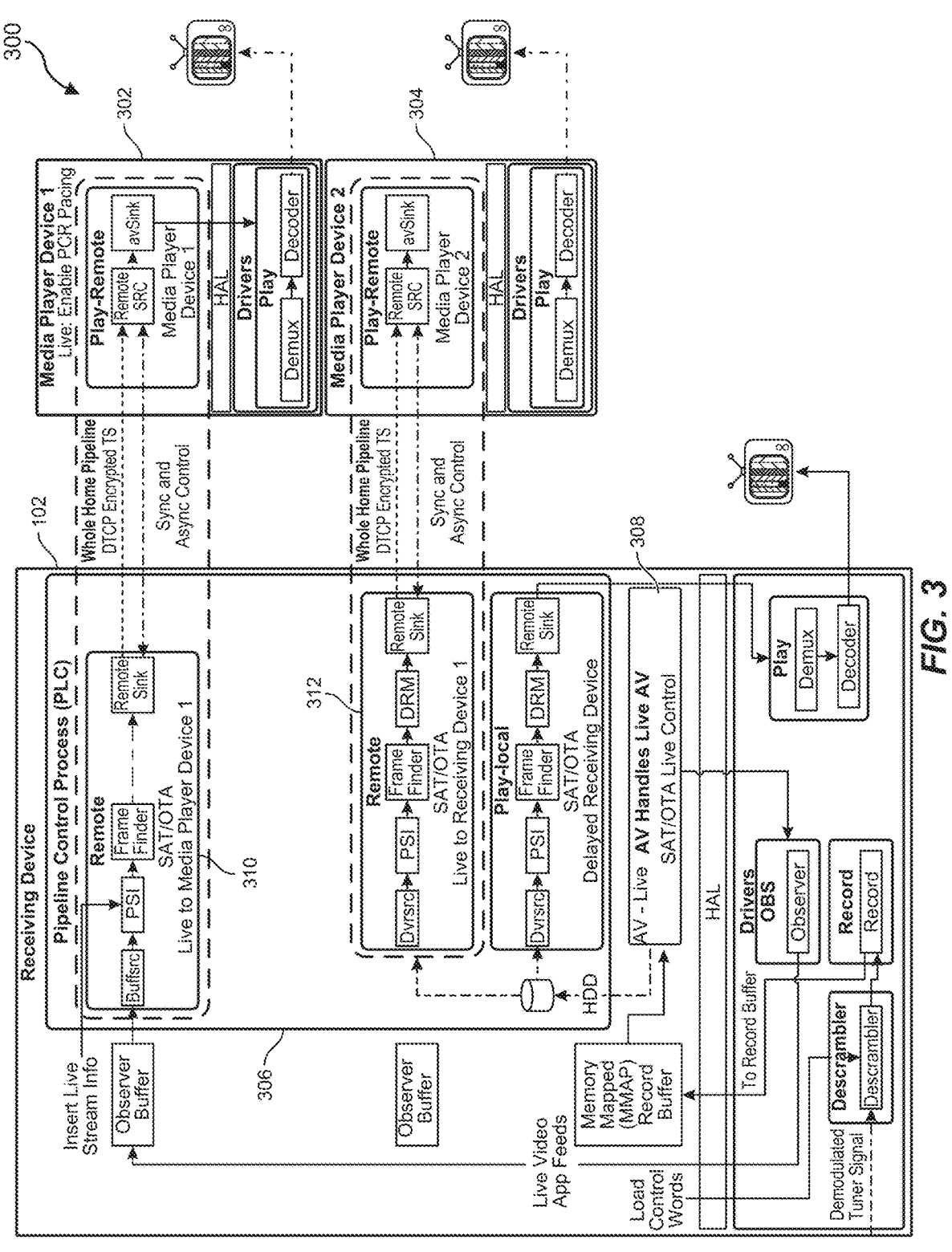
FIG. 3 is an overview block diagram illustrating an example system providing live linear satellite (SAT) broadcast television in which a system for addressable and programmatically delivered ad insertion and playing in live SAT television may be implemented, according to various embodiments described herein.

FIG. 3 is an overview block diagram illustrating an example system 300 providing live linear satellite (SAT) broadcast television in which a system for addressable and programmatically delivered ad insertion and playing in live SAT 104 television may be implemented, according to various embodiments described herein.

The system 300 shown in FIG. 3 supports live and delayed viewing of satellite and over the air (OTA) content on receiving device 102 and media player devices media player device 1 302 and media player device 2 304 (e.g., the Hopper satellite receivers from DISH Network L.L.C. of Englewood, Colorado and AirTVdevices from AirTV L.L.C. of Englewood, Colorado). Via a pipeline control process (PLC) 306 and a satellite SAT/OTA live control process 308, the system 300 provides functionality in the receiving device 102 player to: play Linear SAT streams; play Linear OTA streams; play DVR content, archive and provide FVOD content; play digital video recorder (DVR) trickmodes; perform addressable ad insertion (consistent frame accurate ad insertion); provide picture-in-picture (PIP) and Multiview functionality; provide autohop functionality; provide alternate audio; provide audio only channels; perform sharing and joining; and perform receiving device to receiving device 102 transfers. The pipeline control process (PLC) 306 includes using a remote streamer pipeline 310 for media player device 1 302, a remote streamer pipeline 312 for media player device 2 304, and a play-local streamer pipeline 314 for delayed SAT/OTA content played locally on the receiving device 102. The SAT/OTA live control process 308 handles live AV for the receiving device 102. The remote streamer pipeline 310 for media player device 1 302, a remote streamer pipeline 312 for media player device 2 304 use a Digital Transmission Content Protection (DTCP) transport stream (TS) and synchronous and asynchronous control for streaming content.

Figure 4:
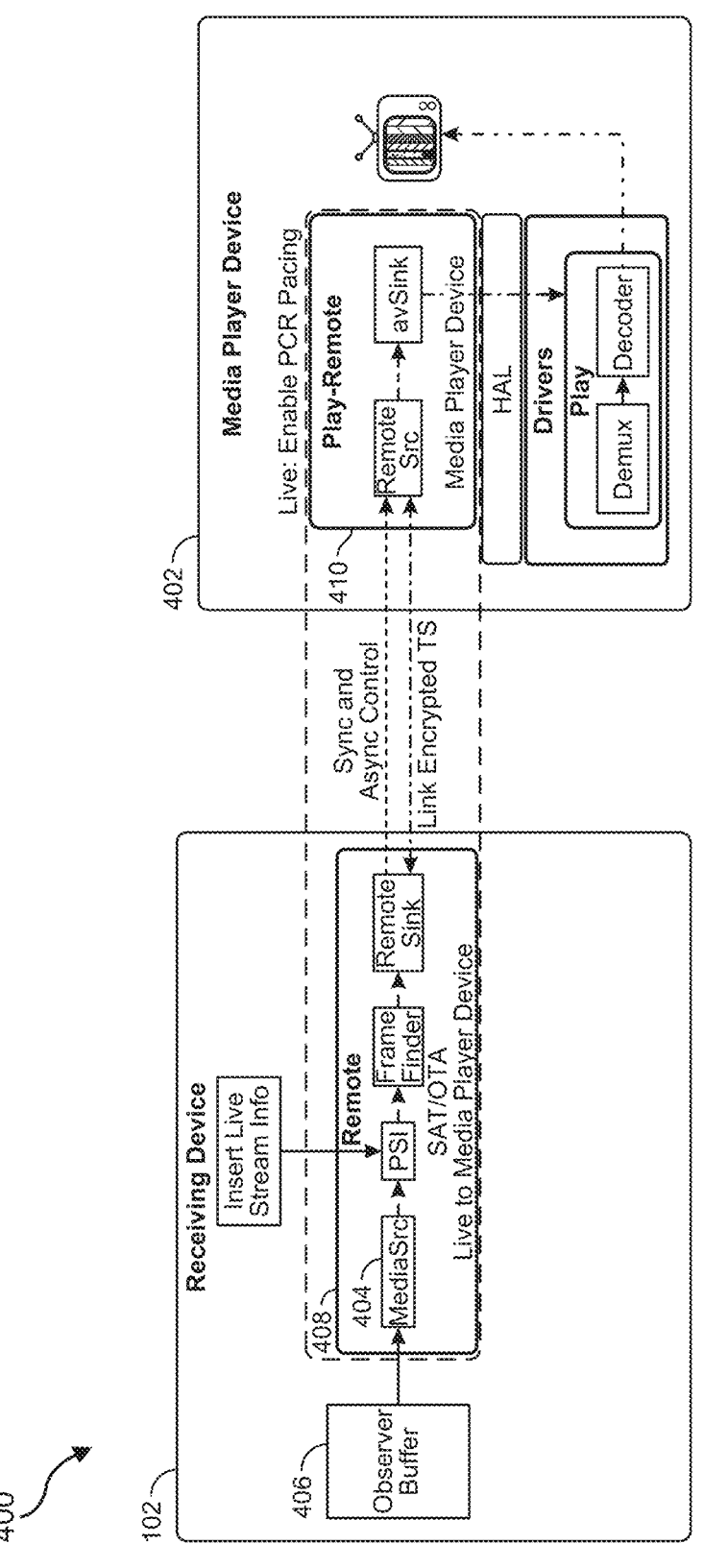
FIG. 4 is an overview block diagram illustrating an example system providing live linear SAT broadcast television from a receiving device to a media player device in which a system for addressable and programmatically delivered ad insertion and playing in live SAT television provided to the media player device may be implemented, according to various embodiments described herein.

FIG. 4 is an overview block diagram illustrating an example system 400 providing live linear SAT broadcast television from a receiving device 102 to a media player device 402 in which a system for addressable and programmatically delivered ad insertion and playing live SAT television provided to the media player device 402 may be implemented, according to various embodiments described herein.

In an example embodiment, the system supports live SAT 104 streaming to Media player device. By providing support to mediaSrc 404 for reading AV data from observer buffer 406 the system creates a pipeline 408 that can stream LIVE SAT content to the media player device 402 via remote streamer pipeline 410.

Figure 5:
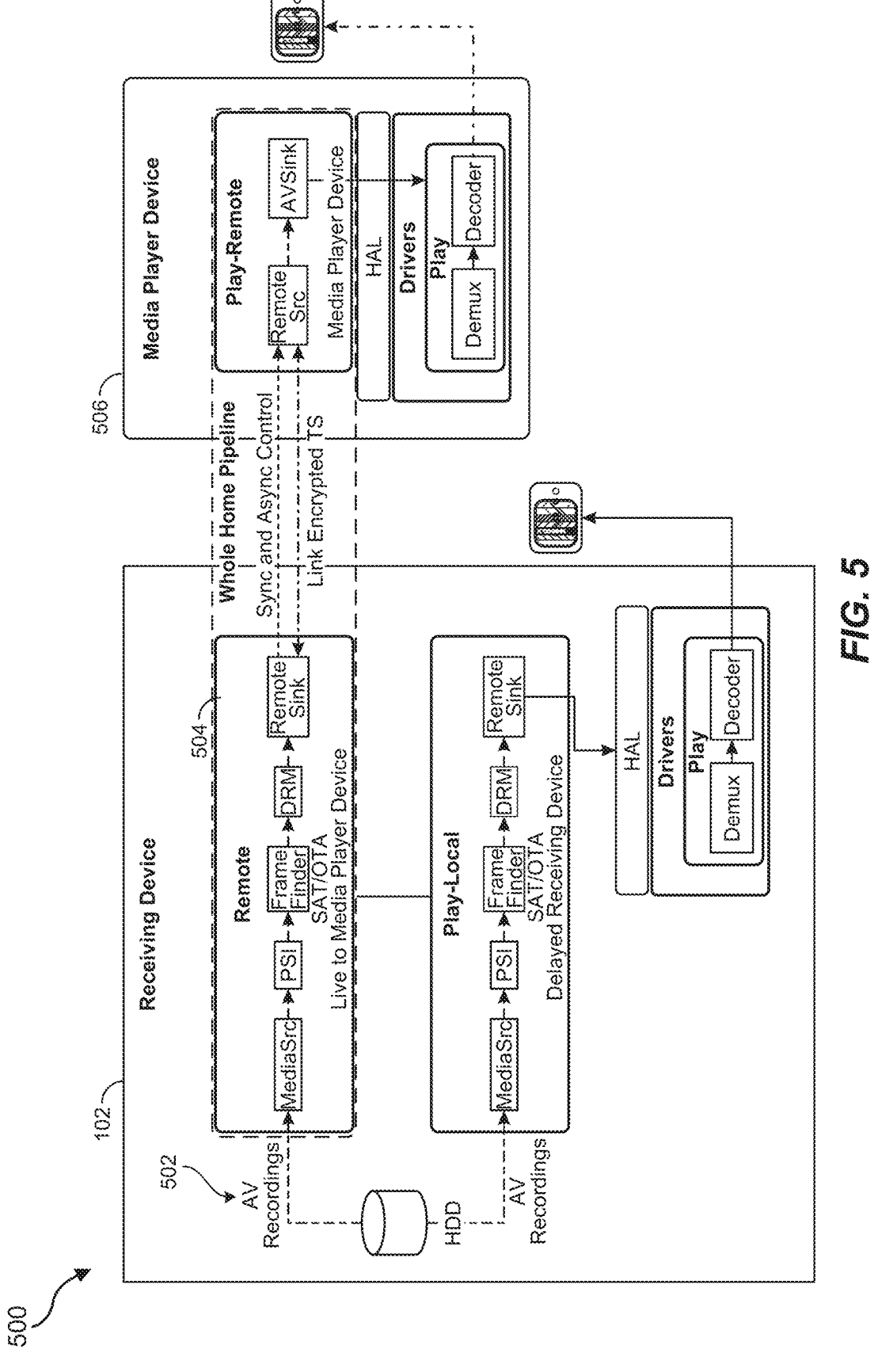
FIG. 5 is an overview block diagram illustrating an example system providing recorded media content in which a system for addressable and programmatically delivered ad insertion and playing for recorded media content may be implemented, according to various embodiments described herein.

FIG. 5 is an overview block diagram illustrating an example system 500 providing recorded media content in which a system for addressable and programmatically delivered ad insertion and playing for recorded media content may be implemented, according to various embodiments described herein. In an example embodiment, the system 500 provides media streaming support for playback of AV recorded files 502 locally on the receiving device 102 and a remote media player device 506. A streaming component 504 shown enables and provides support for: allowing playback of existing formats of AV content; Delay Buffer; DVR; Archive; FVOD; inserting addressable ads; premium content decryption; and DVR trickmode (rewind, fast forward, pause) on non-HLS content.

Figure 6:
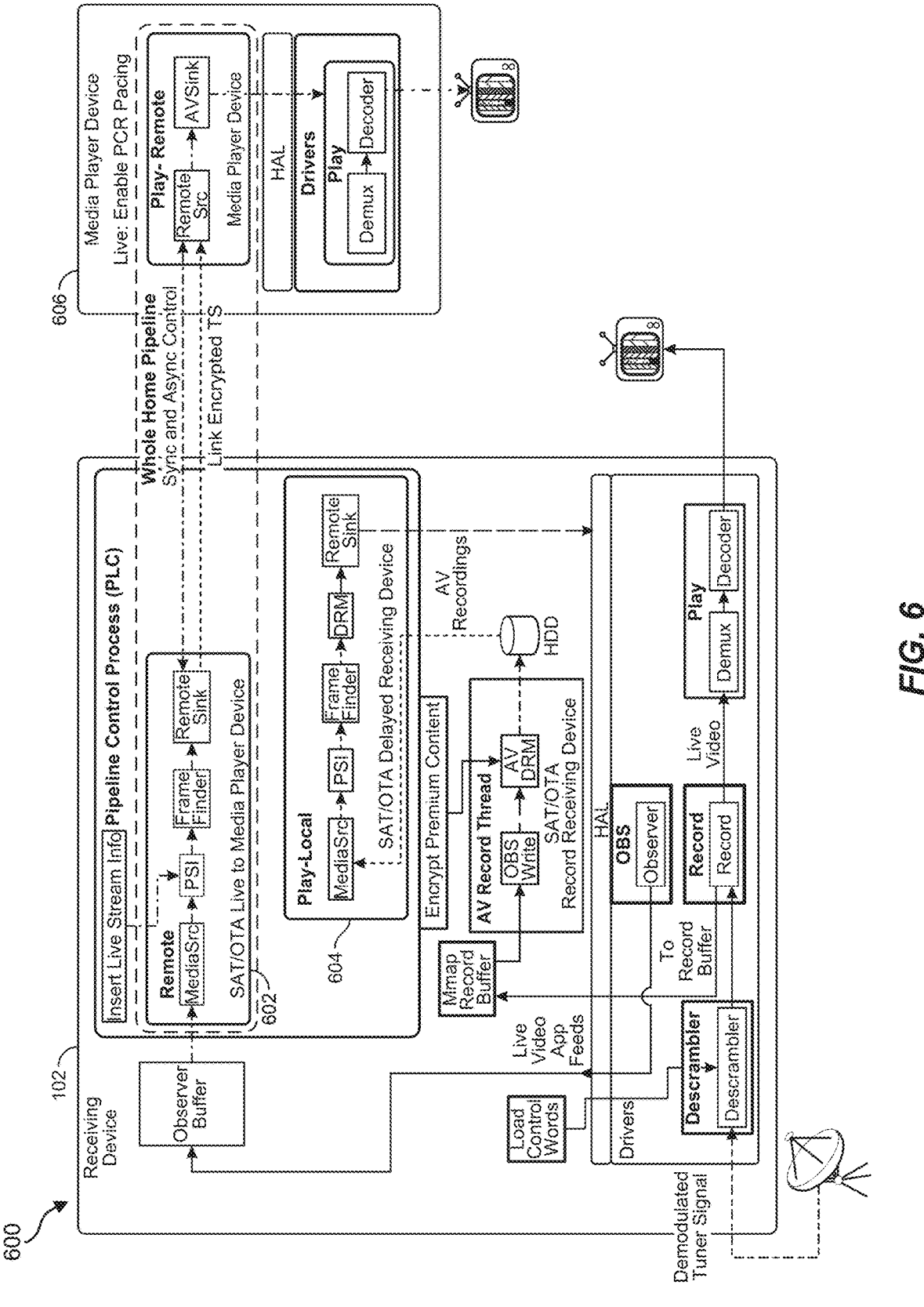
FIG. 6 is an overview block diagram illustrating an example system providing live and delayed media content in which a system for addressable and programmatically delivered ad insertion and playing for live and delayed media may be implemented, according to various embodiments described herein.

FIG. 6 is an overview block diagram illustrating an example system 600 providing live and delayed media content in which a system for addressable and programmatically delivered ad insertion and playing for live and delayed media may be implemented, according to various embodiments described herein.

In an example embodiment, the system 600 integrates streamer pipelines, including remote streamer pipeline 602 and play-local steamer pipeline 604, to provide live and delayed functionality. The system 600 integrates the streamer functionality described herein into the receiving device 102 player to provide the following support on the receiving device 102 and media player device 606: live channel tuning (which enables users to tune to different channels using the different streaming sources); delayed channel playback (which allows pausing and rewinding live TV and then fast-forwarding); DVR trickmodes (which enables pause, rewind and fast-forward of content recorded on the DVR); handling signal loss (missing portion of recordings); free Video on Demand (FVOD), recording to and playing back from DVR; archive playback; and integration with active recordings.

Figure 7:
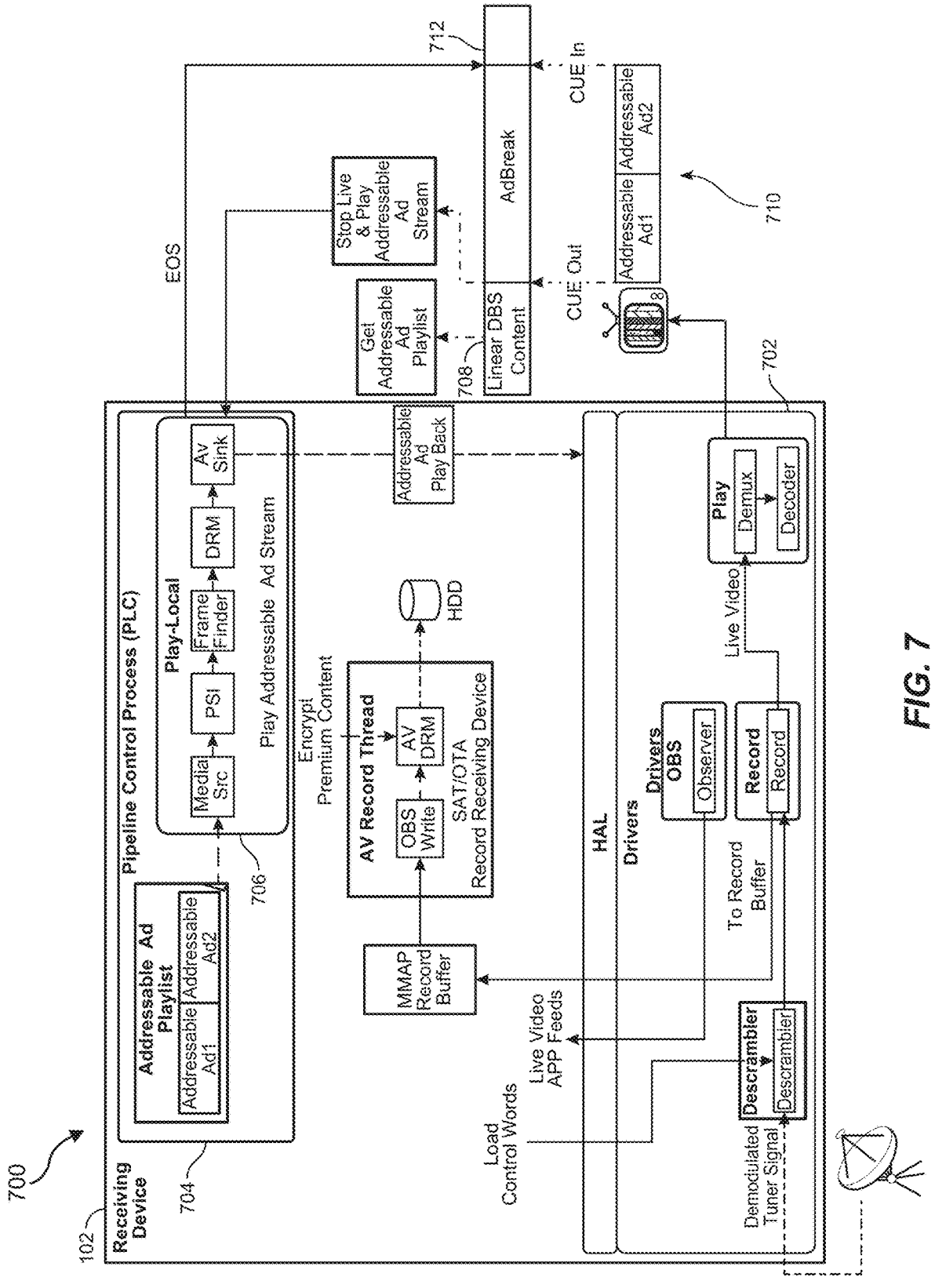
FIG. 7 is an overview block diagram illustrating an example system for addressable ad insertion and playing for live media content delivery, according to various embodiments described herein.

FIG. 7 is an overview block diagram illustrating an example system 700 for addressable ad insertion and playing for live media content delivery, according to various embodiments described herein.

In an example embodiment, the system 700 provides an addressable ad insertion solution for the receiving device 102 in live mode to be able to provide a consistent whole-home ad playback method. The video stream is handled by drivers 702. Via pipeline control process 704 using a play-local streamer pipeline 706, the receiving device 102 (e.g. an STB) triggers transition from live video 708 to addressable ad playback 710 at the cue out point. Once the addressable ad 710 has played, the system 700 switches back to live video 710.

Figure 8:
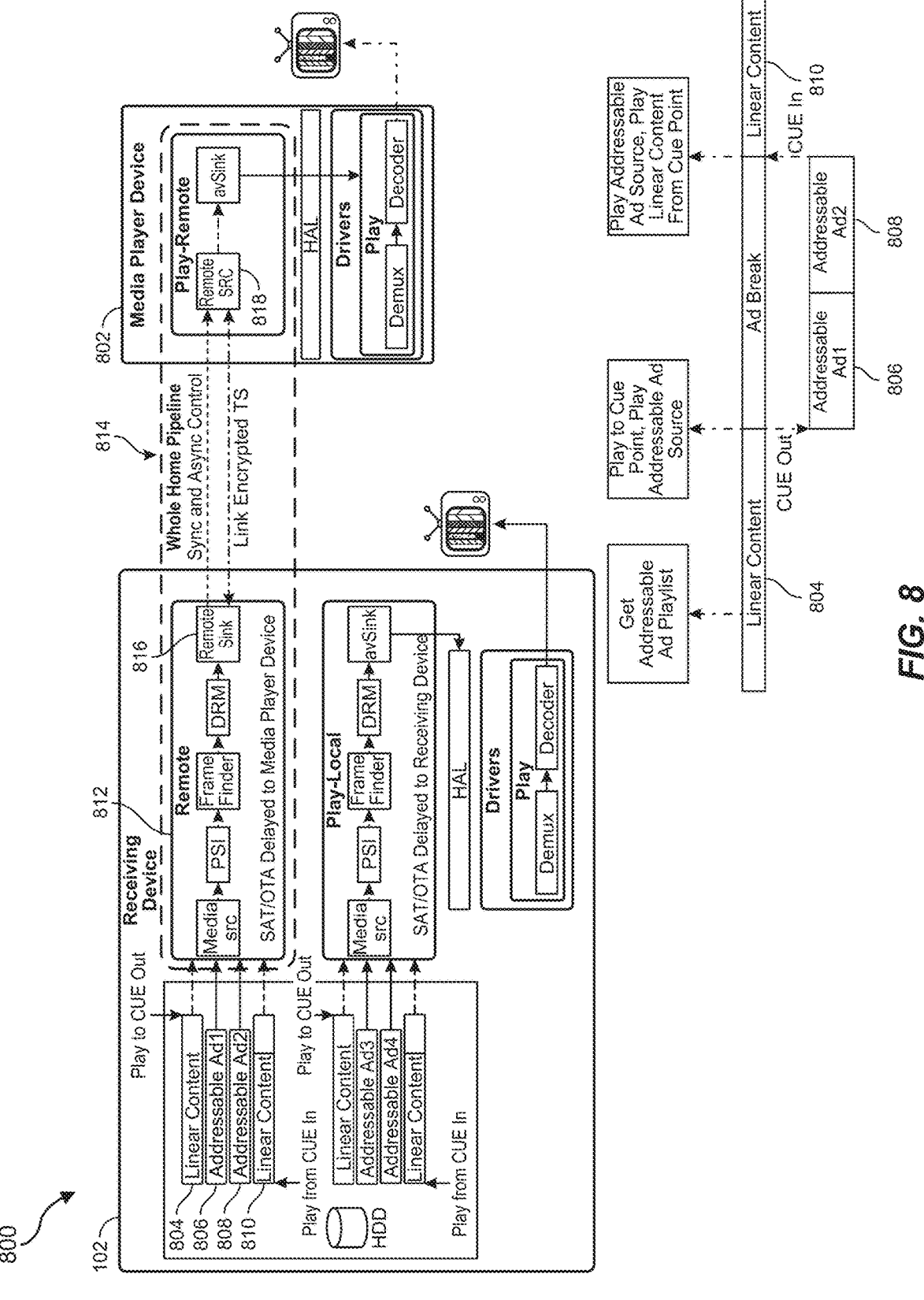
FIG. 8 is an overview block diagram illustrating an example system for addressable ad insertion and playing for delayed media content delivery to a media player device connected to a receiving device, according to various embodiments described herein.

FIG. 8 is an overview block diagram illustrating an example system 800 for addressable ad insertion and playing for delayed media content delivery to a media player device connected to a receiving device 102, according to various embodiments described herein.

In an example embodiment, an IP ad is selected by receiving device 102 based on a current session with each media player device, such as media player device 802. The current session may be or indicate what channel the media player device 802 is currently on, the program playing, etc. The system 800 uses each source (for example, the linear video before ads 804, each ad individually (Ad1 806 and Ad2 808), and linear video 810 after inserted ads) as its own individual stream 812 that is part of the whole home pipeline going to media player device 802, using remote sink 816 and remote source 818 to link each stream from receiving device 102 to media player device 802. In the present example, all decision making and stitching is performed by receiving device 102.

The following methods and corresponding figures may implement and/or be implemented on the system(s) described above and illustrated in FIGS. 1-8.

FIG. 9 is a flowchart illustrating a method for replacing addressable ads with programmatically delivered ads, according to various embodiments described herein.

At 910, the system performs electronically receiving, by one or more processors of a receiving device:
an indication indicating an upcoming advertisement (ad) break in a linear broadcast television signal as the linear broadcast television signal is being received, wherein the indication includes a duration of the ad break and identifies an initial ad playlist including addressable ads initially intended to be played during the ad break.

At 915, the system performs, electronically receiving, by one or more processors of a receiving device, a cue received after the indication, the cue including a presentation time stamp (PTS) indicating when the ad break will start.

At 920, the system performs electronically identifying one or more candidate ads for replacement in the ad playlist as candidates for replacement with programmatically delivered ads.

At 925, the system performs electronically transmitting a request for one or more programmatically delivered replacement ads that have a total duration equal to a total duration of the one or more candidate ads for replacement.

At 930, the system performs initiating downloading of the one or more replacement ads.

At 935, the system performs, upon the downloading of the one or more replacement ads being completed, checking whether a source containing the one or more candidate ads for replacement has been played.

At 940, the system performs, based on the checking, in instances wherein the source containing the one or more candidate ads for replacement has not been played, playing a source containing the one or more replacement ads during the ad break according to a revised ad playlist instead of playing the one or more candidate ads for replacement.

At 945, the system performs, based on the checking, in instances wherein the source containing the one or more candidate ads for replacement has been played, continue playing the source containing the one or more candidate ads for replacement according to the initial ad playlist instead of the one or more replacement ads.

At 950, the system performs, automatically switching back to playing the linear broadcast television signal after the ad break is over.

In an example embodiment, the one or more candidate ads for replacement and the revised ad playlist may include a subset the ads included in the initial ad playlist and the electronically transmitting the request and the initiating downloading of the one or more replacement ads occurs in response to receiving the cue including the PTS. In such an example embodiment, the initiating downloading of the one or more replacement ads may occur, for example, between about 4 and 10 seconds before the ad break in response to receiving the cue including the PTS.

At 955, for each of the one or more replacement ads in the revised ad playlist that is played, the system may automatically report or receive at least one electronic beacon based on playing of at least one portion of the replacement ad to indicate at least one advertisement impression. For example, for each replacement ad that is played, the system may automatically report an electronic beacon indicating the respective ad was played to indicate an advertisement impression. In one example implementation, the system may generate, report or receive (e.g., from a third-party system) the following for each ad request. A tracking event-slot impression-one per ad break, is fired (generated) when an ad break playout starts. This impression may be used by digital ad platforms (e.g., FreeWheel™) to calculate avails. A default impression-one per ad in the ad break, but there may be multiple default impressions for the same ad also. This is fired when the ad starts playing (e.g., within the first 1-2 seconds of an ad). This impression is used for billing purposes. Tracking Events—one per ad in the ad break, but there might be multiple tracking events/quartile impressions for the same ad also. A first quartile impression is fired when 25% of an ad is played. A midpoint impression is fired when 50% of an ad is played. A third quartile impression is fired when 75% of an ad is played. A complete impression is fired when 100% of an ad is played. A backend process adds one slot impression per ad break and one default impression/4 tracking quartile impression for each ad also. This may be used for internal monitoring and reporting. Whenever there is an impression discrepancy with an advertiser data generated by the system may be used our data for comparison.

In another example embodiment, the one or more candidate ads for replacement and the revised ad playlist may include all the ads included in the initial ad playlist and the electronically transmitting the request and the initiating downloading of the one or more replacement ads occurs in response to receiving the indication indicating an upcoming ad break. In such an example embodiment, the indication indicating an upcoming ad break may be received in a time window, for example, between about 20 and 50 minutes before the ad break or upon the receiving device tuning to a channel on which the upcoming ad break will occur.

In another example embodiment, the system may determine, by one or more processors of the receiving device, whether the total duration of the one or more replacement ads is less than the total duration of the one or more candidate ads for replacement. In instances where the total duration of the one or more replacement ads is less than the total duration of the one or more candidate ads for replacement, the system may add to the one or more replacement ads IP-based filler content or ads or other filler content to play during the ad break with the one or more replacement ads, such that a total duration of the filler content and the one or more replacement ads is equal to the total duration of the one or more candidate ads for replacement.

In some embodiments, the techniques described herein include a method wherein the one or more programmatically delivered replacement ads are Internet Protocol (IP) based ads (IP ads 122) that target audiences based on IP address or location indicated by IP address. In various embodiments, the one or more programmatically delivered replacement ads may also be ads that target audiences based on their individual demographics such as age category, marital status, income ranges, gender, education level, occupation, or number of people in the household, etc.

In some embodiments, the techniques described herein include a method wherein the one or more candidate ads for replacement are selected by the receiving device 102 as candidate ads for replacement based on the one or more candidate ads for replacement having not been previously selected based on a particular receiving device 102 receiving the linear broadcast television signal and having not been previously selected based on a particular user account associated with the receiving device 102.

In some embodiments, the techniques described herein include a method wherein ads in the initial ad playlist other than the one or more candidate ads for replacement are selected based on a particular receiving device 102 receiving the linear broadcast television signal or are selected based on a particular user account or other demographic information associated with the receiving device 102.

In some embodiments, the techniques described herein include a method wherein the electronically transmitting a request for one or more programmatically delivered replacement ads that have a total duration equal to a total duration of the one or more candidate ads for replacement includes: calculating a total duration equal to a total duration of the one or more candidate ads for replacement; determining one or more programmatically delivered replacement ads that have a total duration equal to the total duration of the one or more candidate ads for replacement; and transmitting a request for the determined ads from a remote server.

In some embodiments, the techniques described herein include a method wherein the one or more programmatically delivered replacement ads are selected based on one or more of: a current channel of the linear broadcast television signal a receiving device 102 is tuned to on which the replacement ads are to be played; a current program being played on the channel; a genre of the program; a session of a receiving device 102 receiving the linear broadcast television signal; the receiving device 102 receiving the linear broadcast television signal; an IP address of the receiving device 102 receiving the linear broadcast television signal; a media player device to which the receiving device 102 receiving the linear broadcast television signal will transmit the linear broadcast television signal; a session of the media player device to which the receiving device 102 receiving the linear broadcast television signal will transmit the linear broadcast television signal; an IP address of the media player device to which the receiving device 102 receiving the linear broadcast television signal will transmit the linear broadcast television signal; individual user or household demographics; age category; marital status; income range; gender; education level; occupation; and number of people in the household.

In some embodiments, the techniques described herein include a method wherein the initiating downloading of the one or more replacement ads includes: determining whether a current channel of the linear broadcast television signal a receiving device 102 is tuned to on which the replacement ads are to be played is enabled for playing replacement ads on; based on a determination that the current channel is enabled for playing replacement ads on, initiating downloading of the one or more replacement ads.

In some embodiments, the techniques described herein include a method wherein initiating downloading of the one or more replacement ads further includes: determining a current download speed of a broadband network connection available to download the one or more replacement ads; determining available time to download the one or more replacement ads; and based on one or more of: the current download speed of the broadband network connection available to download the one or more replacement ads and the determined available time to download the one or more replacement ads, determining to initiate downloading of the one or more replacement ads over the broadband connection.

In some embodiments, the techniques described herein include a method wherein the downloading of the one or more replacement ads occurs while a program on a current channel of the linear broadcast television signal a receiving device 102 is tuned to is being played by the receiving device 102.

In some embodiments, the techniques described herein include a method wherein the initiating downloading of the one or more replacement ads includes: for each replacement ad of the one or more replacement ads: detecting a current available network bandwidth for downloading the replacement ad; and selecting, based on the available network bandwidth, a version of the replacement ad to download having a bit rate profile from a plurality of versions of the replacement ad each having a respective different bit rate profile, wherein each replacement ad is stored to be played as a constant bit rate stream after downloading.

In some embodiments, the techniques described herein include a method wherein the playing the one or more replacement ads according to the revised ad playlist includes, as the linear broadcast television signal is being received: converting into individual streaming media sources: a portion of the linear broadcast television signal before the PTS indicating when the ad break will start; each ad in the revised ad playlist; and a portion of the linear broadcast television signal after the ad break; playing the one or more replacement ads according to the revised ad playlist by at least: at the PTS, switching from playing a streaming media source including the portion of the linear broadcast television signal before the PTS to playing a first streaming media source including a first ad in the revised ad playlist; switching from playing the first streaming media source including the first ad in the revised ad playlist to playing a streaming media source including a next ad in the revised ad playlist; for each next ad in the revised ad playlist, switching from playing a current streaming media source including a current ad in the revised ad playlist to playing a streaming media source including the next ad in the revised ad playlist; and switching from playing a streaming media source including a last ad in the revised ad playlist to playing a streaming media source including a portion of the linear broadcast television signal after the ad break.

In some embodiments, the time at which particular content is downloaded and the selection of such content may be triggered or be otherwise based on one or more detected viewing patterns of the user. In particular, a particular viewing pattern may trigger a download of content associated with that viewing pattern or characteristics associated with that viewing pattern. For example, the system may detect that a user has watched football for three hours every Sunday for the past 3 weeks (or other threshold number of weeks). The system may then automatically download or prefetch replacement ads associated with football or a demographic associated with football the next time the user tunes in to a football game on Sunday based on a prediction that the user will continue to watch the football game. In some embodiments, ads may be prefetched using techniques such as those described in U.S. patent application Ser. No. 18/449,976, filed on Aug. 15, 2023, titled "PREFETCHING ADVERTISEMENTS FOR STREAMING DELIVERY", and/or U.S. Provisional Application No. 63/579,440, filed on Aug. 29, 2023, titled "ADVERTISEMENT CACHING FOR TARGETED DELIVERY", which are hereby incorporated by reference in their entirety.

In some embodiments, the techniques described herein include a method wherein a bit rate selected of the one or more replacement ads to be downloaded is based on how far in advance of the ad break the initiating downloading occurs, such that a replacement ad with a higher bit rate is selected for downloading when the initiating downloading occurs further in advance of the ad break than when the initiating downloading occurs closer in time to the ad break.

In some embodiments, the techniques described herein include a method further including: during downloading of the one or more replacement ads, receiving indication of a channel change to a different channel in the linear broadcast television signal; in response to receiving indication of a channel change, canceling the download if the download is not finished and canceling any initiating playing ads according to the revised playlist.

In some embodiments, the techniques described herein include a method, further including: caching the identified one or more replacement ads on a remote server from which the one or more replacement ads are downloaded; electronically generating another revised ad playlist including the one or more cached replacement ads and initiating downloading of the one or more cached replacement ads after receiving another indication indicating an additional upcoming ad break in the linear broadcast television signal and based on no advertisers having bid on programmatically delivered replacement ads to include in the additional ad break. The caching may be performed, in one example embodiment, using caching techniques such as those described in U.S. Provisional Application No. 63/579,440, filed on Aug. 29, 2023, titled "ADVERTISEMENT CACHING FOR TARGETED DELIVERY", which is hereby incorporated by reference in its entirety.

In some embodiments, the techniques described herein include a method, further including: for each of the one or more replacement ads in the revised ad playlist that is played, automatically reporting at least one electronic beacon based on playing of at least one portion of the replacement ad to indicate at least one advertisement impression.

In some embodiments, the techniques described herein include a method, wherein the linear broadcast television signal is a satellite broadcast television signal.

In some embodiments, the techniques described herein include a method wherein the automatically switching back to playing the linear broadcast television signal after the ad break is over includes: generating an end-of-stream (EOS) signal after playing all ads listed in the revised ad playlist or after a total duration of the ad break; and in response to the EOS signal, automatically switching back to playing the linear broadcast television signal.

FIG. 10 is a flowchart illustrating a method for seamlessly stitching programmatically delivered ads into a content media stream, according to various embodiments described herein.

At 1010, the system performs electronically receiving, by one or more processors, a cue out presentation time stamp (PTS) indicating a beginning of an upcoming advertising (ad) break when playing media content.

At 1020, the system performs playing a first streaming media source including first portion of the media content until arriving at the cue out PTS during playing of the first streaming media source.

At 1030, the system performs calculating a cue in PTS based on a total ad break duration of the ad break.

At 1040, the system performs saving a first file position in the first streaming media source when crossing over the cue out point corresponding to the cue out point during the playing the first streaming media source.

At 1050, the system performs starting at the cue out PTS, automatically switching from playing the first streaming media source to playing one or more additional streaming media sources in succession until the cue in point PTS, wherein each additional streaming media source content includes a respective ad of a plurality of ads.

At 1060, the system performs, for each respective ad of the plurality of ads that is played, automatically reporting an electronic beacon indicating the respective ad was played to indicate an advertisement impression.

At 1070, the system performs, during the switching from playing the first streaming media source to playing one or more additional streaming media sources, saving respective additional file positions corresponding to each switch between streaming media sources.

At 1080, the system performs, starting at the cue in PTS, automatically switching from playing the one or more additional streaming media sources to a second streaming media source including a second portion of the media content following the cue in PTS.

In some embodiments, the techniques described herein include a method, further including: after switching from playing the one or more additional streaming media sources to the second streaming media source including the second portion of the media content following the cue in PTS, receiving a user input indicating to rewind play; in response to receiving a user input indicating to rewind play, using the saved file positions, rewinding play over the second portion of the media content that was played following the cue in PTS, each respective ad that was played and at least a portion of the first portion of the media content was played before the cue out PTS; after the rewinding, receiving user input indicating normal play from a point in the first portion of the media content was played; and in response to receiving the user input indicating normal play, starting the normal play from the point.

In some embodiments, the techniques described herein include a method, further including: using the saved file positions: playing again the first portion of the media content was played before the cue out PTS, playing again each respective ad that was played, and playing again the second portion of the media content that was played following the cue in PTS; and for each respective ad of the plurality of ads that is played again, automatically reporting an electronic beacon indicating the respective ad was played again to indicate another advertisement impression for the respective ad.

In some embodiments, the techniques described herein include a method, wherein: the first streaming media source is for a particular episode of a television series played on-demand via streaming media delivered from a remote server or read from a local digital video recorder (DVR); the one or more additional streaming media sources played in succession is for one or more respective ads of a plurality of ads to be played automatically between the particular episode of the television series and a next episode in the television series over streaming media; and the second streaming media source is for the next episode in the television series played automatically via streaming media delivered from a remote server or read from the DVR after the one or more respective ads is played.

In some embodiments, the techniques described herein include a method, wherein the media content is content of a television channel of a linear broadcast satellite television signal currently tuned to and currently being received by a receiving device 102 implementing the media presentation system. In some embodiments, the media content may be received via other over-the-air (OTA) television (TV) signals to which the receiving device 102 is tuned. OTA TV is a category of television broadcasting which makes use of television signals transferred by radio waves from television stations. OTA TV television receives the radio waves with the help of a receiver device connected to a TV antenna. For example, such OTA signals may be those complying with Advanced Television Systems Committee (ATSC) standards, which are an American set of standards for digital television transmission over terrestrial, cable and satellite networks. In some embodiments, the OTA TV signal may be a high-definition television broadcast from a local television station.

In some embodiments, the techniques described herein include a method, wherein the media content is streaming media delivered from a remote server or read from a local DVR.

In some embodiments, the techniques described herein include a method wherein one or more of the plurality of ads are addressable ads and one or more of the plurality of ads are programmatically delivered Internet Protocol (IP) based ads (IP ads 122) which were selected to replace one or more candidate ads for replacement that were to be inserted in the media content while it is being played by a particular media player device, and further including: selecting the one or more candidate ads for replacement based on the one or more candidate ads for replacement not being previously selected based on the particular media player device and not being previously selected based on a particular user account associated with the media player device.

In some embodiments, the techniques described herein include a method, wherein the media content is streaming media read from a local DVR, and further including: pacing a rate at which the media content from the DVR is read such that the calculating of the cue in PTS based on the total ad break duration of the upcoming ad break may be performed and acted upon before the cue out PTS is reached when playing the media content.

In some embodiments, the techniques described herein include a method wherein the electronically receiving the cue out PTS indicating a beginning of an upcoming advertising (ad) break when playing media content includes receiving an indication of the PTS in a range of about 5 seconds to about 12 seconds before arriving at the PTS during playing the first streaming media source.

FIG. 11 is a flowchart illustrating a method for a receiving device 102 requesting and stitching ads for media player device connected to receiving device 102 over a network, according to various embodiments described herein.

At 1110, the system performs electronically receiving, by one or more processors of a receiving device 102, a cue out presentation time stamp (PTS) indicating a beginning of an upcoming advertising (ad) break when transmitting media content from the receiving device 102 to a media player device over a network for playing by the media player device as one or more streaming media sources.

At 1120, the operation includes the receiving device 102 transmitting a first streaming media source over the network to the media player device including a first portion of the media content for playing by the media device until the receiving device 102 arrives at the cue out PTS during transmitting the first streaming media source over the network to the media player device.

At 1130, the operation includes the receiving device 102 calculating a cue in PTS based on a total ad break duration of the ad break.

At 1140, the system performs, starting at the cue out PTS, the receiving device 102 automatically switching from transmitting the first streaming media source over the network to the media player device for playing by the media device to transmitting one or more additional streaming media sources over the network to the media player device in succession until the cue in point PTS for playing by the media device is reached, wherein each additional streaming media source content includes a respective ad of a plurality of ads played by the media player device.

At 1150, the system performs, for each respective ad of the plurality of ads that is played by the media player device, the receiving device 102 automatically reporting an electronic beacon indicating the respective ad was played to indicate an advertisement impression.

At 1160, the system performs, starting at the cue in PTS, the receiving device 102 automatically switching from transmitting the one or more additional streaming media sources over the network to the media player device to transmitting second streaming media source including a second portion of the media content to the media player device for playing by the media device following the cue in PTS.

In some embodiments, the techniques described herein include a method, further including: in response to electronically receiving, by one or more processors of the receiving device 102, a cue out presentation time stamp (PTS) indicating the beginning of an upcoming advertising (ad) break, electronically obtaining an initial ad playlist including addressable ads initially intended to be played during the ad break; electronically identifying one or more candidate ads for replacement in the initial ad playlist as candidates for replacement with programmatically delivered ads; electronically transmitting a request for one or more programmatically delivered replacement ads that have a total duration equal to a total duration of the one or more candidate ads for replacement; electronically generating a revised ad playlist including the one or more replacement ads such that a total duration of all ads in the revised ad playlist equals a total duration of all ads in the initial playlist and equals the duration of the ad break; initiating downloading of the one or more replacement ads, wherein the plurality of ads played by the media player device includes the downloaded one or more replacement ads.

In some embodiments, the techniques described herein include a method wherein the one or more candidate ads for replacement are selected by the receiving device 102 as candidate ads for replacement based on the one or more candidate ads for replacement having not been previously selected based on a particular media player device connected to the receiving device 102 and having not been previously selected based on a particular user account associated with a particular media player device connected to the receiving device 102.

In some embodiments, the techniques described herein include a method wherein ads in the initial ad playlist other than the one or more candidate ads for replacement are selected based on the media player device or are selected based on a particular user account associated with the media player device.

In some embodiments, the techniques described herein include a method wherein: the first streaming media source and the second streaming media source transmitted to the media player device includes a linear broadcast television signal begin received by the receiving device 102; and the one or more programmatically delivered replacement ads are selected by the receiving device 102 based on one or more of: a current channel of the linear broadcast television signal the media player device has caused the receiving device 102 to be tuned to and on which the replacement ads are to be played; a current program being played by the media player device; a genre of the current program; a session of the media player device in which the first streaming media source is received; an IP address of the receiving device 102; and an IP address of the a media player device.

In some embodiments, the techniques described herein include a method, further including: the receiving device 102 generating, specifically for transmitting to the media player device, the first streaming media source, the one or more additional streaming media sources each including a respective ad of the plurality of ads, and the second streaming media source.

In some embodiments, the techniques described herein include a method, wherein the plurality of ads includes one or more programmatically delivered replacement ads that the receiving device 102 inserted to replace one or more other initial ads that were to be transmitted by the receiving device 102 to be played by the media player device.

FIG. 12 is a flowchart illustrating a method for ad insertion by a receiving device 102 providing a customer based and platform independent streaming service from the receiving device 102, according to various embodiments described herein.

At 1210, the system performs electronically receiving, by one or more processors of a receiving device 102, a cue out presentation time stamp (PTS) indicating a beginning of an upcoming advertising (ad) break when transcoding media content at the receiving device specifically for a selected one of a plurality of destinations.

At 1220, the operation includes the receiving device 102 transmitting a first transcoded streaming media source over the network to the selected destination including a first portion of the media content for playing at a destination device until the receiving device 102 arrives at the cue out PTS during transmitting the first streaming media source over the network to the selected destination.

At 1230, the operation includes the receiving device 102 calculating a cue in PTS based on a total ad break duration of the ad break.

At 1240, the operation includes the receiving device 102 delaying transcoding of one or more additional streaming media sources to be transmitted over the network to the destination to select a respective ad of a plurality of ads as each of the one or more additional streaming media sources.

At 1250, the system performs, starting at the cue out PTS, the receiving device 102 transmitting the one or more transcoded additional streaming media sources over the network to the destination in succession until the cue in point PTS is reached.

In some embodiments, the techniques described herein include a method, further including: for each respective ad of the plurality of ads that is transmitted to the destination via the transcoded additional streaming media sources, the receiving device 102 automatically reporting an electronic beacon indicating the respective ad was played to indicate an advertisement impression.

In some embodiments, the techniques described herein include a method, further including: starting at the cue in PTS, the receiving device 102 automatically switching from transmitting the one or more transcoded additional streaming media sources to transmitting to the destination a second transcoded streaming media source including media content following the cue in PTS.

In some embodiments, the techniques described herein include a method wherein the first transcoded streaming media source, the one or more transcoded additional streaming media sources and the second transcoded streaming media source include a browser-based pipeline for a web client.

In some embodiments, the techniques described herein include a method wherein: the first transcoded streaming media source and the second transcoded streaming media source includes a linear broadcast television signal.

In some embodiments, the techniques described herein include a method, further including: the receiving device 102 generating, specifically for transcoding for the destination, the first streaming media source, the one or more additional streaming media sources, and the second streaming media source.

In some embodiments, the techniques described herein include a method, wherein the plurality of ads includes one or more programmatically delivered replacement ads that the receiving device 102 inserted to replace one or more other initial ads that were to be transcoded and transmitted by the receiving device 102 to the destination.

In some embodiments, using the chunking and stitching process, any DVR or live channel could be manipulated. This could also include presentation of pre and post roll advertisements. Impressions or beacons for ads may be sent via the receiving device 102 to an advertisement management system. Also, this could be implemented via a browser based pipeline client for a customer based and platform independent streaming service from the receiving device 102 and advanced television (ATV). The system may include continue (aka binge) watching episodic ad insertions, which may include IP or file based advertising inserted via the chunking and stitching process after the end of DVR or IPVOD episodic content and in between the playback of multiple sequential episodes.

FIG. 13 is a flowchart illustrating a method for using an HDMI CEC signal to know when a presentation device is being powered down and/or powered up and download and insert an ad before the presentation device powers down and/or upon it powering up, according to various embodiments described herein.

At 1310, the system performs determining, by the receiving device 102 that a presentation device connected to the receiving device 102 is about to power up or power down based on the HDMI CEC signal. For example, a user may press a button on a remote control to turn off a television, and the television may signal to an attached satellite receiver it is turning off via an HDMI CEC signal.

At 1320, the system performs determining, by the receiving device 102, to immediately insert an advertisement (ad) break and play on the presentation device one or more advertisements in the ad break based on the determination that the presentation device connected to the receiving is about to power up or power down.

At 1340, the system performs, in response to the determination to immediately insert an ad break, electronically transmitting a request for one or more ads that have a total duration equal to a total duration of the ad break. At 1350, the system performs electronically generating an ad playlist that consists of one or more ads that have a total duration equal to a total duration of the ad break.

At 1360, the system performs initiating downloading of the one or more ads in the ad playlist.

At 1370, the system performs initiating playing the one or more ads on the presentation device.

At 1375, for each of the one or more ads played on presentation device, the system automatically reports an electronic beacon indicating the respective ad was played to indicate an advertisement impression.

In some embodiments, the techniques described herein include a method wherein the receiving device 102 determines that the presentation device is about power down based on the HDMI CEC signal and the initiating playing of the one or more ads on the presentation device occurs immediately before the presentation device powers down. Ads may also be cached locally or remotely for playing at a future time. The caching and/or playing of the ad may be triggered or be otherwise based on one or more detected usage patterns of the user. For example, a particular usage pattern may trigger a download of ad content associated with that usage pattern or characteristics associated with that usage pattern.

In some embodiments, the techniques described herein include a method wherein the receiving device 102 determines that the presentation device is about power up based on the HDMI CEC signal and the initiating playing of the one or more ads on the presentation device occurs immediately after the presentation device powers up.

In some embodiments, the techniques described herein include a method wherein playing of the one or more ads on the presentation device occurs before any other media content is presented on the presentation device after the powering up of the presentation device.

In some embodiments, the techniques described herein include a method wherein the electronically generating an ad playlist includes replacing one or more addressable ads that were initially in the ad playlist with programmatically delivered replacement ads that have a total duration equal to the replaced one or more addressable ads.

In some embodiments, the techniques described herein include a method wherein the programmatically delivered replacement ads are Internet Protocol (IP) based ads (IP ads 122) that target audiences based on IP address or location indicated by IP address.

In some embodiments, the techniques described herein include a method wherein the initiating playing the one or more ads on the presentation device includes delaying powering down of the presentation device to download and play all of the one or more ads in the ad playlist.

FIG. 14 is a flowchart illustrating a method for using maintenance notifications from smart devices to initiate playing relevant ads on a presentation device, according to various embodiments described herein.

At 1410, the system performs electronically receiving, by one or more processors of a receiving device 102, an indication of one or more maintenance notifications from one or more corresponding smart devices connected to the receiving device 102 via a network.

At 1420, the system performs determining, by the receiving device 102, to insert in an advertisement (ad) break in media content currently being played by the receiving device 102 and play on a presentation device connected to the receiving device 102 one or more advertisements in the ad break based on the one or more maintenance notifications.

At 1430, the system performs, in response to the determination to insert in the ad break and play on the presentation device one or more advertisements in the ad break, electronically transmitting a request for one or more ads that have a total duration equal to a total duration of the ad break.

At 1440, the system performs electronically generating an ad playlist that consists of one or more ads that have a total duration equal to a total duration of the ad break.

At 1450, the system performs initiating downloading of the one or more ads in the ad playlist.

At 1460, the system performs initiating playing the one or more ads on the presentation device.

At 1465, for each of the one or more ads played on the presentation device, the system automatically reports an electronic beacon indicating the respective ad was played to indicate an advertisement impression.

In an example embodiment, the determination to insert in an ad break in media content currently being played by the receiving device 102 and play on the presentation device one or more advertisements in the ad break based on the one or more maintenance notifications may be performed utilizing techniques for selecting advertisements for output by the receiving device 102 based on processing of non-television electronic communications received from an external device, such as those described in U.S. Patent Application Publication No. 20110194838A1, titled "Methods and Apparatus For Presenting Supplemental Content In Association With Recorded Content", filed Feb. 9, 2010, which is hereby incorporated by reference in its entirety.

In some embodiments, the techniques described herein include a method wherein playing of the one or more ads on the presentation device occurs via separate respective streaming media sources for each of the one or more ads.

In some embodiments, the techniques described herein include a method wherein the electronically generating an ad playlist includes replacing one or more addressable ads that were initially in the ad playlist with programmatically delivered replacement ads that have a total duration equal to the replaced one or more addressable ads.

In some embodiments, the techniques described herein include a method wherein the programmatically delivered replacement ads are Internet Protocol (IP) based ads (IP ads 122) that target audiences based on IP address or location indicated by IP address.

In some embodiments, the techniques described herein include a method wherein the initiating playing the one or more ads on the presentation device includes is enabled only when all of the one or more ads in the ad playlist has been downloaded.

In some embodiments, the techniques described herein include a method wherein the one or more maintenance notifications includes a maintenance notification from a smart refrigerator that a new filter is needed; and based on the maintenance notification from a smart refrigerator that a new filter is needed the receiving device 102 includes in the request a request for a programmatically delivered IP ad for filters that replaces a previously selected addressable ad for the playlist.

In some embodiments, the techniques described herein include a method wherein the one or more maintenance notifications includes a maintenance notification from a smart washing machine that a load of laundry is finished; and based on the maintenance notification from the smart washing machine that a load of laundry is finished, the receiving device 102 includes in the request a request for a programmatically delivered IP ad for laundry detergent that replaces a previously selected addressable ad for the playlist.

FIG. 15 is a flowchart illustrating a method for implementing an entire ad break that is uniquely owned and designated only for programmatically delivered Internet Protocol (IP) based ads (IP ads 122), according to various embodiments described herein.

At 1510, the system performs electronically receiving, by one or more processors of a receiving device 102, an indication via a private data persistent identifier, indicating an upcoming advertisement (ad) break in a linear broadcast television signal as the linear broadcast television signal is being received, wherein the indication includes a cue out presentation time stamp (PTS) indicating when the ad break will start and a duration of the ad break;

At 1520, the system performs determining the entire ad break is uniquely owned and designated only for programmatically delivered Internet Protocol (IP) based ads (IP ads).

At 1530, the system performs parsing metadata and one or more cues in a streaming media source including the linear broadcast television signal to determine ownership of the ad break.

At 1540, the system performs determining the ownership matches an ownership identifier (ID) dynamically set in the receiving device 102.

At 1550, the system performs, in response to determining the ownership matches an ownership identifier (ID) dynamically set in the receiving device 102, electronically transmitting a request for one or more IP ads which have a total duration equal to the duration of the ad break.

At 1560, the system performs electronically generating an ad playlist including the one or more requested ads such that a total duration of all ads in the ad playlist equals the duration of the ad break.

At 1570, the system performs initiating downloading of the one or more ads in the ad playlist.

At 1580, the system performs, in response to arriving at the PTS, when playing the linear broadcast television signal, initiating playing ads according to the ad playlist.

At 1585, for each of the ads played according to the ad playlist, the system automatically reports an electronic beacon indicating the respective ad was played to indicate an advertisement impression.

In some embodiments, the techniques described herein include a method further including: before initiating playing a first ad listed in the ad playlist, automatically checking whether all of the one or more ads have finished downloading; based on the checking, in instances wherein all of the one or more ads have finished downloading, playing the one or more ads according to the ad playlist; based on the checking, in instances wherein all of the one or more ads have not finished downloading, playing one or more replacement ads instead of the one or more ads in the playlist; and automatically switching back to playing the linear broadcast television signal after the ad break is over.

In some embodiments, the techniques described herein include a method wherein the initiating downloading of the one or more ads further includes: determining a current speed of a broadband network connection available to download the one or more ads; determining whether the speed of the broadband network connection available to download the one or more ads meets a minimum threshold; and based a determination that the speed of the broadband network connection available to download the one or more ads meets a minimum threshold, initiating downloading of the one or more ads over the broadband connection.

In some embodiments, the techniques described herein include a method wherein the downloading of the one or more ads occurs while a program on a current channel of the linear broadcast television signal a receiving device 102 is tuned to is being played by the receiving device 102.

In some embodiments, the techniques described herein include a method wherein the initiating downloading of the one or more ads includes: for each ad of the one or more replacement ads: detecting a current available network bandwidth for downloading the ad; and selecting, based on the available network bandwidth, a version of the ad to download having a bit rate profile from a plurality of versions of the ad each having a respective different bit rate profile, wherein each ad is stored to be played as a constant bit rate stream after downloading.

In some embodiments, the techniques described herein include a method further including: before the receiving the indication indicating an upcoming advertisement (ad) break, converting into individual streaming media sources: a portion of the linear broadcast television signal before the PTS indicating when the ad break will start; each ad in the ad playlist; and a portion of the linear broadcast television signal after the ad break;

In some embodiments, the techniques described herein include a method, wherein the initiating downloading of the one or more ads in the ad playlist includes playing, by the receiving device 102, the one or more ads according to the ad playlist by at least: at the PTS, switching from playing a streaming media source including the portion of the linear broadcast television signal before the PTS to playing a first streaming media source including a first ad in the ad playlist; switching from playing the first streaming media source including the first ad in the ad playlist to playing a streaming media source including a next ad in the ad playlist; for each next ad in the ad playlist, switching from playing a current streaming media source including a current ad in the ad playlist to playing a streaming media source including the next ad in the ad playlist; and switching from playing a streaming media source including a last ad in the ad playlist to playing a streaming media source including a portion of the linear broadcast television signal after the ad break.

FIG. 16 is a flowchart illustrating a method for making a service providing a live linear satellite broadcast content stream free to a consumer by inserting additional ads into a live linear satellite broadcast program, according to various embodiments described herein.

At 1610, the system performs electronically receiving, by one or more processors, a cue out presentation time stamp (PTS) indicating a beginning of an upcoming advertising (ad) break when playing a live linear satellite content stream.

At 1620, the system performs playing a first streaming media source including first portion of the live linear satellite broadcast content stream until arriving at the cue out PTS during playing of the first streaming media source.

At 1630, the system performs calculating a cue in PTS based on a total ad break duration of the ad break.

At 1640, the system performs, starting at the cue out PTS, automatically switching from playing the first streaming media source to playing one or more additional streaming media sources in succession until the cue in point PTS, wherein each additional streaming media source content includes a respective ad of a plurality of ads to be added to the live linear satellite content stream and extending a length of a television program of the live linear satellite content stream to make a service providing the live linear satellite content stream including the television program free (or reduced price) to a consumer.

At 1650, the system performs, starting at the cue in PTS, automatically switching from playing the one or more additional streaming media sources to a second streaming media source including a second portion of the live linear satellite content stream following the cue in PTS.

In some embodiments, the techniques described herein include a method, further including: saving a first file position in the first streaming media source when crossing over the cue out point corresponding to the cue out point during the playing the first streaming media source.

In some embodiments, the techniques described herein include a method, further including: during the switching from playing the first streaming media source to playing one or more additional streaming media sources, saving respective additional file positions corresponding to each switch between streaming media sources.

In some embodiments, the techniques described herein include a method, further including: for each respective ad of the plurality of ads that is played, automatically reporting an electronic beacon indicating the respective ad was played to indicate an advertisement impression.

In some embodiments, the techniques described herein include a method, further including: after switching from playing the one or more additional streaming media sources to the second streaming media source, receiving a user input indicating to rewind play; in response to receiving a user input indicating to rewind play, using the saved file positions, rewinding play over the second portion of the media content that was played following the cue in PTS, each respective ad that was played and at least a portion of the first portion of the media content was played before the cue out PTS; after the rewinding, receiving user input indicating normal play from a point in the first portion of the media content was played; and in response to receiving the user input indicating normal play, starting the normal play from the point.

In some embodiments, the techniques described herein include a method, further including: using the saved file positions: playing again the first portion of the media content was played before the cue out PTS, playing again each respective ad that was played, and playing again the second portion of the media content that was played following the cue in PTS; and for each respective ad of the plurality of ads that is played again, automatically reporting an electronic beacon indicating the respective ad was played again to indicate another advertisement impression for the respective ad.

In some embodiments, the techniques described herein include a method wherein one or more of the plurality of ads are programmatically delivered Internet Protocol (IP) based ads (IP ads).

Figure 17:
FIG. 17 shows a system diagram that describes an example implementation of computing system(s) for implementing embodiments described herein.

FIG. 17 shows a system diagram that describes an example implementation of computing system(s) 1700 for implementing embodiments described herein. For example, such computing systems 1700, or components thereof may include one or more computing systems of receiving devices, media player devices, servers, remote devices and/ or other devices referenced herein.

The functionality described herein for systems and methods for addressable advertisement and programmatically delivered advertisement insertion and playing, or components thereof, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 17 illustrates an example of underlying hardware on which such software and functionality may be hosted and/or implemented.

In particular, shown is example host computer system(s) 1701. For example, such computer system(s) 1701 may represent one or more of those in receiving device 102s, media player devices, various data centers and servers that are, components of, or that host or implement the functions of, aspects described herein to implement systems and methods for addressable advertisement and programmatically delivered advertisement insertion and playing. In some embodiments, one or more special-purpose computing systems may be used to implement the functionality described herein. Accordingly, various embodiments described herein may be implemented in software, hardware, firmware, or in some combination thereof. Host computer system(s) 1701 may include memory 1702, one or more central processing units (CPUs) 1714, I/O interfaces 1718, other computer-readable media 1720, and network connections 1722.

Memory 1702 may include one or more various types of non-volatile and/or volatile storage technologies. Examples of memory 1702 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1702 may be utilized to store information, including computer-readable instructions that are utilized by CPU 1714 to perform actions, including those of embodiments described herein.

Memory 1702 may have stored thereon control module(s) 1704. The control module(s) 1704 may be configured to implement and/or perform some or all of the functions of the systems, components and modules described herein to implement systems and methods for addressable advertisement and programmatically delivered advertisement insertion and playing. Memory 1702 may also store other programs and data 1710, which may include rules, databases, application programming interfaces (APIs), software containers, nodes, pods, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc. In an example embodiment, the memory 1702 may be non-transitory computer-readable storage medium (meaning it is not a signal being transmitted that carries information). This storage medium may store computer-executable instructions. Then these instructions may be executed by at least one processor (e.g., CPUs 1714). The execution of these instructions cause the processor to perform various operations, including operations that implement the functionality described herein.

Network connections 1722 are configured to communicate with other computing devices to facilitate the functionality described herein. In various embodiments, the network connections 1722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1718 may include a video interfaces, other data input or output interfaces, or the like. Other computer-readable media 1720 may include other types of stationary or removable computer-readable media, such as removable flash drives, external hard drives, or the like. In various embodiments, the particular order of the operations described herein may be rearranged; some operations may be performed in parallel; shown operations may be omitted, or other operations may be included; a shown operation may be divided into one or more component operations, or multiple shown operations may be combined into a single operation, etc.

Applicant hereby incorporates by reference the following US patent applications and patents in their entirety: U.S. Pat. No. 7,631,331 B2, issued on Dec. 8, 2009, entitled "CROSS-CHANNEL INTERSTITIAL PROGRAM PROMOTION"; U.S. Pat. No. 11,178,469 B2, issued on Nov. 16, 2021, entitled "PRE-DISTRIBUTION IDENTIFICATION OF BROADCAST TELEVISION CONTENT USING AUDIO FINGERPRINTS"; U.S. Patent Publication No. 2009/0304358 A1, published on Dec. 10, 2009, entitled "PROVIDING CONTENT INTERRUPTIONS"; U.S. Patent Publication No. 2011/0194838, published on Jan. 15, 2015, entitled "METHODS AND APPARATUS FOR PRESENTING SUPPLEMENTAL CONTENT IN ASSOCIATION WITH RECORDED CONTENT"; U.S. Patent Publication No. 2011/0197224, published on Aug. 11, 20211, entitled "METHODS AND APPARATUS FOR SELECTING ADVERTISEMENTS FOR OUTPUT BY A TELEVISION RECEIVER BASED ON SOCIAL NETWORK PROFILE DATA"; U.S. patent application Ser. No. 17/827,211, filed on May 27, 2022, entitled "DETECTING CONTENT OF INTEREST IN STREAMING MEDIA"; U.S. patent application Ser. No. 18/449,976, filed on Aug. 15, 2023, entitled "PREFETCHING ADVERTISEMENTS FOR STREAMING DELIVERY"; and U.S. Provisional Application No. 63/579,440, filed on Aug. 29, 2023, entitled "ADVERTISEMENT CACHING FOR TARGETED DELIVERY".

The various embodiments described above can be combined to provide further embodiments. Aspects of the embodiments can be modified, if necessary to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a media presentation system, the method comprising:

electronically receiving, by one or more processors of a receiving device, a cue out presentation time stamp (PTS) indicating a beginning of an upcoming advertising (ad) break when playing media content;

playing a first streaming media source including first portion of the media content until arriving at the cue out PTS during playing of the first streaming media source;

calculating a cue in PTS based on a total ad break duration of the ad break;

saving a first file position in the first streaming media source when crossing over the cue out point corresponding to the cue out point during the playing the first streaming media source;

starting at the cue out PTS, automatically switching from playing the first streaming media source to playing one or more additional streaming media sources in succession until the cue in point PTS, wherein each additional streaming media source content includes a respective ad of a plurality of ads;

for each respective ad of the plurality of ads that is played, automatically reporting an electronic beacon indicating the respective ad was played to indicate an advertisement impression;

during the switching from playing the first streaming media source to playing one or more additional streaming media sources, saving respective additional file positions corresponding to each switch between streaming media sources;

starting at the cue in PTS, automatically switching from playing the one or more additional streaming media sources to a second streaming media source including a second portion of the media content following the cue in PTS;

electronically receiving, by one or more processors of the receiving device, an indication via a private data persistent identifier, indicating an additional upcoming advertisement (ad) break in a linear broadcast television signal as the linear broadcast television signal is being received, wherein the indication includes an additional cue out presentation time stamp (PTS) indicating when the additional ad break will start and a duration of the additional ad break;

determining an entirety of the additional break is uniquely owned and designated only for programmatically delivered Internet Protocol (IP) based ads (IP ads);

parsing metadata and one or more cues in a streaming media source including the linear broadcast television signal to determine ownership of the additional ad break;

determining the ownership matches an ownership identifier (ID) dynamically set in the receiving device;

in response to determining the ownership matches an ownership identifier (ID) dynamically set in the receiving device, electronically transmitting a request for one or more IP ads which have a total duration equal to the duration of the additional ad break;

electronically generating an ad playlist including the one or more requested ads such that a total duration of all ads in the ad playlist equals the duration of the additional ad break;

initiating downloading of the one or more ads in the ad playlist; and in response to arriving at the additional cue out PTS when playing the linear broadcast television signal, initiating playing downloaded ads according to the ad playlist.

2. The method of claim 1, further comprising:

after switching from playing the one or more additional streaming media sources to the second streaming media source including the second portion of the media content following the cue in PTS, receiving a user input indicating to rewind play;

in response to receiving a user input indicating to rewind play, using the saved file positions, rewinding play over the second portion of the media content that was played following the cue in PTS, each respective ad that was played and at least a portion of the first portion of the media content was played before the cue out PTS;

after the rewinding, receiving user input indicating normal play from a point in the first portion of the media content was played; and in response to receiving the user input indicating normal play, starting the normal play from the point.

3. The method of claim 2, further comprising:

using the saved file positions:

playing again the first portion of the media content was played before the cue out PTS, playing again each respective ad that was played, and playing again the second portion of the media content that was played following the cue in PTS; and for each respective ad of the plurality of ads that is played again, automatically reporting an electronic beacon indicating the respective ad was played again to indicate another advertisement impression for the respective ad.

4. The method of claim 1, wherein:

the first streaming media source is for a particular episode of a television series played on-demand via streaming media delivered from a remote server or read from a local digital video recorder (DVR);

the one or more additional streaming media sources played in succession is for one or more respective ads of a plurality of ads to be played automatically between the particular episode of the television series and a next episode in the television series over streaming media; and the second streaming media source is for the next episode in the television series played automatically via streaming media delivered from a remote server or read from the DVR after the one or more respective ads is played.

5. The method of claim 1, wherein the media content is content of a television channel of a linear broadcast satellite television signal currently tuned to and currently being received by the receiving device.

6. The method of claim 1, wherein the media content is streaming media delivered from a remote server or read from a local DVR.

7. The method of claim 1 wherein one or more of the plurality of ads are addressable ads and one or more of the plurality of ads are programmatically delivered Internet Protocol (IP) based ads (IP ads) which were selected to replace one or more candidate ads for replacement that were to be inserted in the media content while it is being played by a particular media player device, and further comprising:

selecting the one or more candidate ads for replacement based on the one or more candidate ads for replacement not being previously selected based on the particular media player device and not being previously selected based on a particular user account associated with the media player device.

8. The method of claim 1, wherein the media content is streaming media read from a local DVR, and further comprising:

pacing a rate at which the media content from the DVR is read such that the calculating of the cue in PTS based on the total ad break duration of the upcoming ad break may be performed and acted upon before the cue out PTS is reached when playing the media content.

9. The method of claim 1 wherein the electronically receiving the cue out PTS indicating a beginning of an upcoming advertising (ad) break when playing media content includes receiving an indication of the PTS in a range of about 5 seconds to about 12 seconds before arriving at the PTS during playing the first streaming media source.

10. The method of claim 1 wherein each respective ad of the plurality of ads is added to the media content and extends a length of a television program included in the media content to make a service providing the media content including the television program free to a consumer.

11. The method of claim 10 wherein the television program included in the media content is provided as part of a live linear satellite television broadcast being received by the receiving device and streamed by the receiving device as the first streaming media source.

12. A media presentation system comprising:

at least one computer processor;

at least one non-transitory memory device coupled to the at least one processor, the at least one non-transitory memory device having computer-executable instructions stored thereon which, when executed by the at least one computer processor, cause operations to be performed, the operations including:

electronically receiving, by one or more processors of a receiving device, a cue out presentation time stamp (PTS) indicating a beginning of an upcoming advertising (ad) break when playing media content;

playing a first streaming media source including first portion of the media content until arriving at the cue out PTS during playing of the first streaming media source;

calculating a cue in PTS based on a total ad break duration of the ad break;

saving a first file position in the first streaming media source when crossing over the cue out point corresponding to the cue out point during the playing the first streaming media source;

starting at the cue out PTS, automatically switching from playing the first streaming media source to playing one or more additional streaming media sources in succession until the cue in point PTS, wherein each additional streaming media source content includes a respective ad of a plurality of ads;

for each respective ad of the plurality of ads that is played, automatically reporting an electronic beacon indicating the respective ad was played to indicate an advertisement impression;

during the switching from playing the first streaming media source to playing one or more additional streaming media sources, saving respective additional file positions corresponding to each switch between streaming media sources;

starting at the cue in PTS, automatically switching from playing the one or more additional streaming media sources to a second streaming media source including a second portion of the media content following the cue in PTS;

electronically receiving, by one or more processors of the receiving device, an indication via a private data persistent identifier, indicating an additional upcoming advertisement (ad) break in a linear broadcast television signal as the linear broadcast television signal is being received, wherein the indication includes an additional cue out presentation time stamp (PTS) indicating when the additional ad break will start and a duration of the additional ad break;

determining an entirety of the additional break is uniquely owned and designated only for programmatically delivered Internet Protocol (IP) based ads (IP ads);

parsing metadata and one or more cues in a streaming media source including the linear broadcast television signal to determine ownership of the additional ad break;

determining the ownership matches an ownership identifier (ID) dynamically set in the receiving device;

in response to determining the ownership matches an ownership identifier (ID) dynamically set in the receiving device, electronically transmitting a request for one or more IP ads which have a total duration equal to the duration of the additional ad break;

electronically generating an ad playlist including the one or more requested ads such that a total duration of all ads in the ad playlist equals the duration of the additional ad break;

initiating downloading of the one or more ads in the ad playlist; and in response to arriving at the additional cue out PTS when playing the linear broadcast television signal, initiating playing downloaded ads according to the ad playlist.

13. The system of claim 12, wherein the operations further comprise:

after switching from playing the one or more additional streaming media sources to the second streaming media source including the second portion of the media content following the cue in PTS, receiving a user input indicating to rewind play;

in response to receiving a user input indicating to rewind play, using the saved file positions, rewinding play over the second portion of the media content that was played following the cue in PTS, each respective ad that was played and at least a portion of the first portion of the media content was played before the cue out PTS;

after the rewinding, receiving user input indicating normal play from a point in the first portion of the media content was played; and in response to receiving the user input indicating normal play, starting the normal play from the point.

14. The system of claim 13, wherein the operations further comprise:

using the saved file positions:

playing again the first portion of the media content was played before the cue out PTS, playing again each respective ad that was played, and playing again the second portion of the media content that was played following the cue in PTS; and for each respective ad of the plurality of ads that is played again, automatically reporting an electronic beacon indicating the respective ad was played again to indicate another advertisement impression for the respective ad.

15. A non-transitory computer-readable storage medium having computer-executable instructions stored thereon which, when executed by at least one computer processor, cause operations to be performed, the operations including:

electronically receiving, by one or more processors of a receiving device, a cue out presentation time stamp (PTS) indicating a beginning of an upcoming advertising (ad) break when playing media content;

playing a first streaming media source including first portion of the media content until arriving at the cue out PTS during playing of the first streaming media source;

calculating a cue in PTS based on a total ad break duration of the ad break;

saving a first file position in the first streaming media source when crossing over the cue out point corresponding to the cue out point during the playing the first streaming media source;

starting at the cue out PTS, automatically switching from playing the first streaming media source to playing one or more additional streaming media sources in succession until the cue in point PTS, wherein each additional streaming media source content includes a respective ad of a plurality of ads;

for each respective ad of the plurality of ads that is played, automatically reporting an electronic beacon indicating the respective ad was played to indicate an advertisement impression;

during the switching from playing the first streaming media source to playing one or more additional streaming media sources, saving respective additional file positions corresponding to each switch between streaming media sources;

starting at the cue in PTS, automatically switching from playing the one or more additional streaming media sources to a second streaming media source including a second portion of the media content following the cue in PTS;

electronically receiving, by one or more processors of the receiving device, an indication via a private data persistent identifier, indicating an additional upcoming advertisement (ad) break in a linear broadcast television signal as the linear broadcast television signal is being received, wherein the indication includes an additional cue out presentation time stamp (PTS) indicating when the additional ad break will start and a duration of the additional ad break;

determining an entirety of the additional break is uniquely owned and designated only for programmatically delivered Internet Protocol (IP) based ads (IP ads);

parsing metadata and one or more cues in a streaming media source including the linear broadcast television signal to determine ownership of the additional ad break;

determining the ownership matches an ownership identifier (ID) dynamically set in the receiving device;

in response to determining the ownership matches an ownership identifier (ID) dynamically set in the receiving device, electronically transmitting a request for one or more IP ads which have a total duration equal to the duration of the additional ad break;

electronically generating an ad playlist including the one or more requested ads such that a total duration of all ads in the ad playlist equals the duration of the additional ad break;

initiating downloading of the one or more ads in the ad playlist; and in response to arriving at the additional cue out PTS when playing the linear broadcast television signal, initiating playing downloaded ads according to the ad playlist.

16. The non-transitory computer-readable storage medium of claim 15, wherein the operations further comprise:

after switching from playing the one or more additional streaming media sources to the second streaming media source including the second portion of the media content following the cue in PTS, receiving a user input indicating to rewind play;

in response to receiving a user input indicating to rewind play, using the saved file positions, rewinding play over the second portion of the media content that was played following the cue in PTS, each respective ad that was played and at least a portion of the first portion of the media content was played before the cue out PTS;

after the rewinding, receiving user input indicating normal play from a point in the first portion of the media content was played; and in response to receiving the user input indicating normal play, starting the normal play from the point.

17. The non-transitory computer-readable storage medium of claim 16, wherein the operations further comprise:

using the saved file positions:

playing again the first portion of the media content was played before the cue out PTS, playing again each respective ad that was played, and playing again the second portion of the media content that was played following the cue in PTS; and for each respective ad of the plurality of ads that is played again, automatically reporting an electronic beacon indicating the respective ad was played again to indicate another advertisement impression for the respective ad.

* * * * *